(12) United States Patent
Kato et al.

(10) Patent No.: US 7,703,968 B2
(45) Date of Patent: Apr. 27, 2010

(54) DISPLAY UNIT

(75) Inventors: Tomonobu Kato, Kyoto (JP);
Toshimitsu Fujiwara, Kyoto (JP)

(73) Assignee: OMRON Corporation, Kyoto (JP)

( * ) Notice: Subject to any disclaimer, the term of this patent is extended or adjusted under 35 U.S.C. 154(b) by 64 days.

(21) Appl. No.: 12/095,410

(22) PCT Filed: Dec. 13, 2006

(86) PCT No.: PCT/JP2006/324838

§ 371 (c)(1),
(2), (4) Date: May 29, 2008

(87) PCT Pub. No.: WO2007/069642

PCT Pub. Date: Jun. 21, 2007

(65) Prior Publication Data

US 2009/0161388 A1      Jun. 25, 2009

(30) Foreign Application Priority Data

Dec. 14, 2005    (JP) .............................. 2005-360447

(51) Int. Cl.
*F21V 7/04*    (2006.01)
*G09F 13/18*   (2006.01)

(52) U.S. Cl. .................. 362/606; 362/625; 362/812; 40/546

(58) Field of Classification Search .......... 362/600, 362/604, 606, 607, 812; 40/564, 541, 546
See application file for complete search history.

(56) References Cited

U.S. PATENT DOCUMENTS 6,308,444 B1 * 10/2001 Ki .............................. 40/546
6,889,456 B2 *  5/2005 Shibata et al. ............... 40/546

FOREIGN PATENT DOCUMENTS

| JP | 53-133595 | 10/1978 |
| JP | 55-113568 | 8/1980 |
| JP | 56-55880 | 5/1981 |
| JP | 59-33028 | 9/1984 |
| JP | 61-201080 | 12/1986 |
| JP | 2002-297070 A | 10/2002 |
| JP | 2003-050556 | 2/2003 |
| JP | 2003-255871 | 9/2003 |
| JP | 3503608 | 12/2003 |
| JP | 3541561 | 7/2004 |

OTHER PUBLICATIONS

Patent Abstracts of Japan, Publication No. 2003-255871 dated Sep. 10, 2003, 1 page.

(Continued)

*Primary Examiner*—Ali Alavi
(74) *Attorney, Agent, or Firm*—Osha • Liang LLP

(57) ABSTRACT

A display unit includes a light source and at least one or more transparent display plates. Each transparent display plate has a plurality of fine dimples formed on at least one surface thereof Light rays from the light source are respectively made incident on the transparent display plates and are reflected by the plurality of fine dimples so that a pattern of at least one of characters, graphics, and symbols is made visually observed uniformly.

19 Claims, 28 Drawing Sheets

OTHER PUBLICATIONS

Patent Abstracts of Japan, Publication No. 2003-050556 dated Feb. 21, 2003, 1 page.

International Search Report issued in PCT Application No. PCT/JP2006/324838, mailed on Mar. 20, 2007, w/ translation, 8 pages.

Notification of Opinions from The First Examination for Chinese Application No. 2006800423584 date Jun. 5, 2009 and English translation thereof, 15 pages.

* cited by examiner

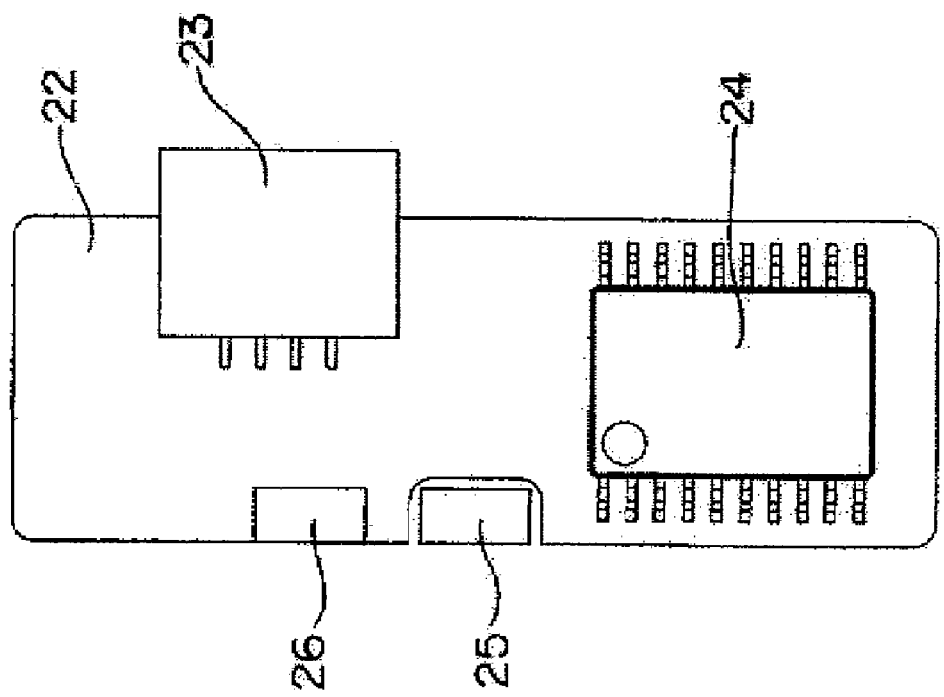
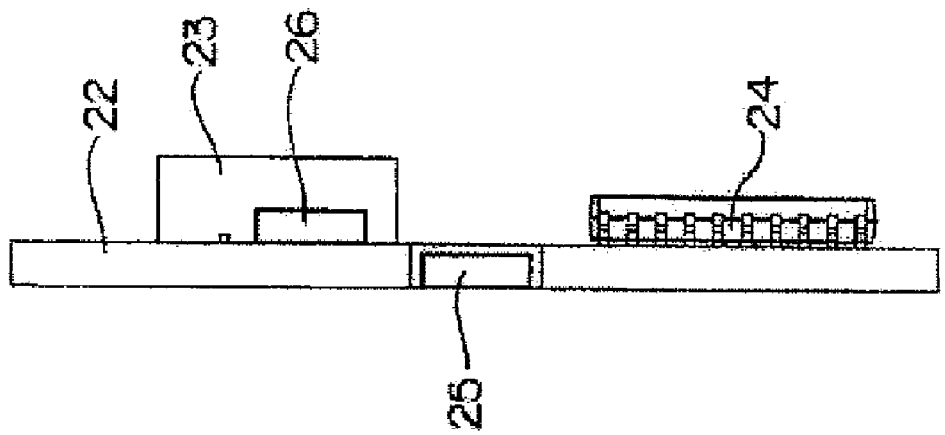

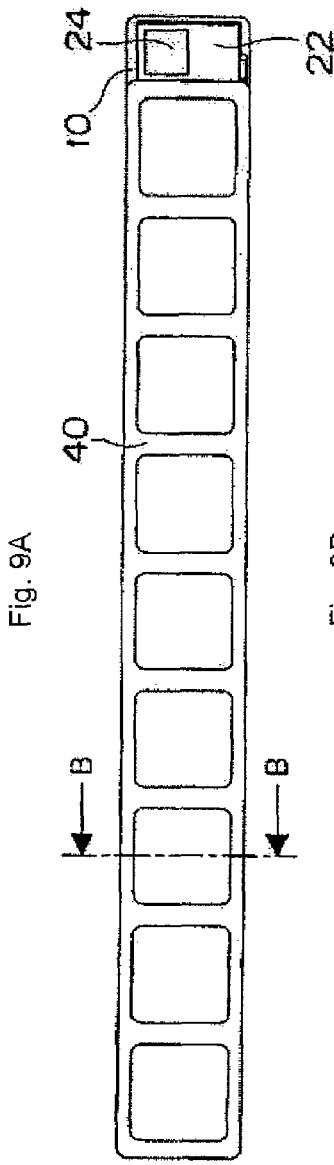
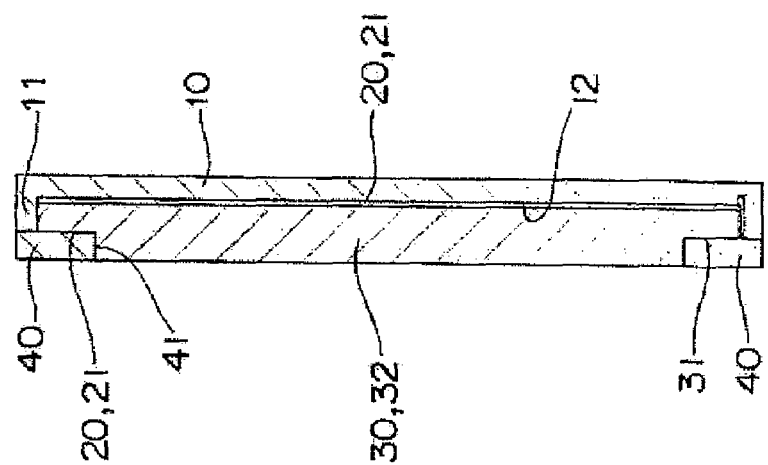
Fig. 9A
Fig. 9B

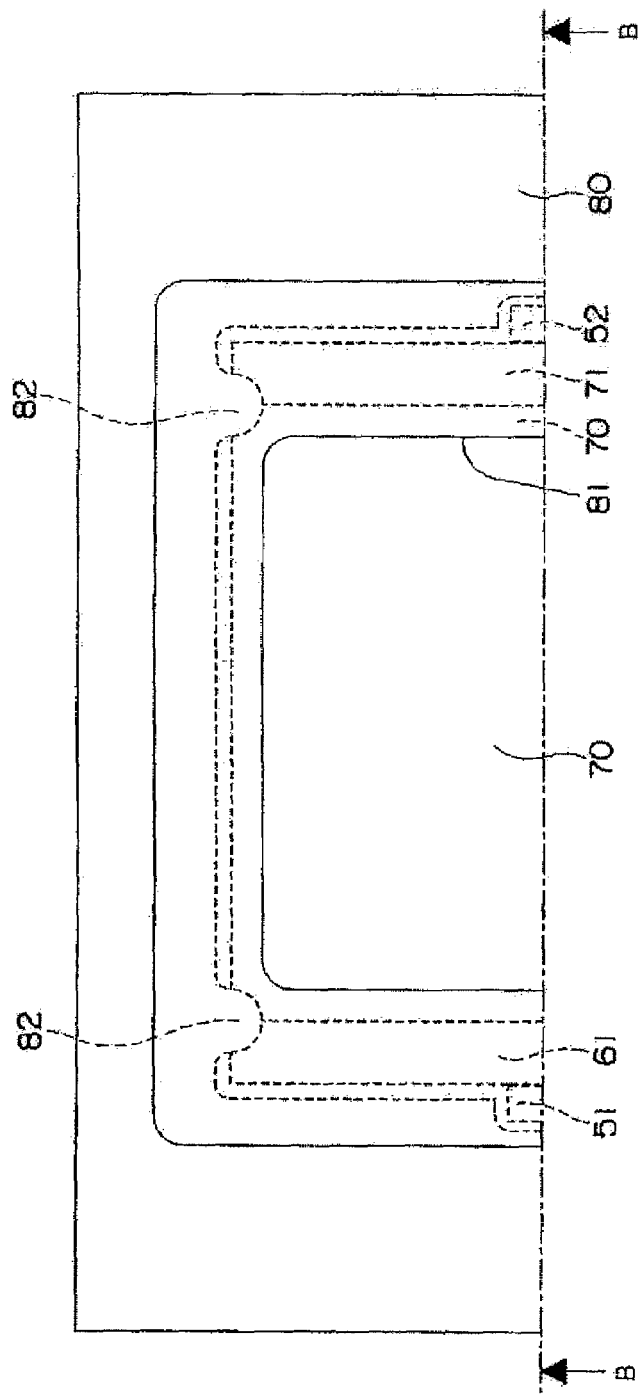
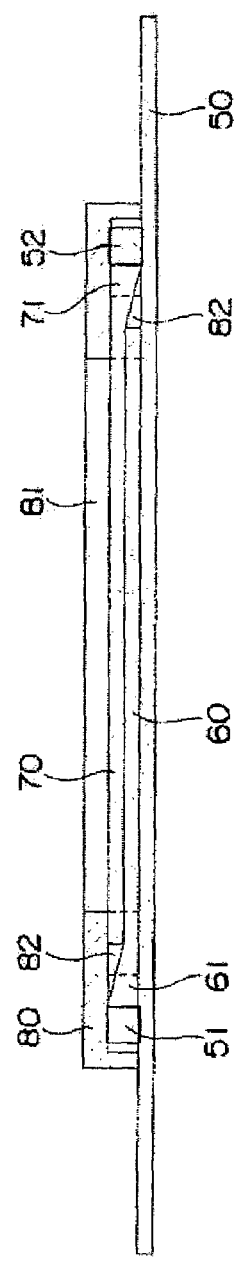
Fig. 11A
Fig. 11B

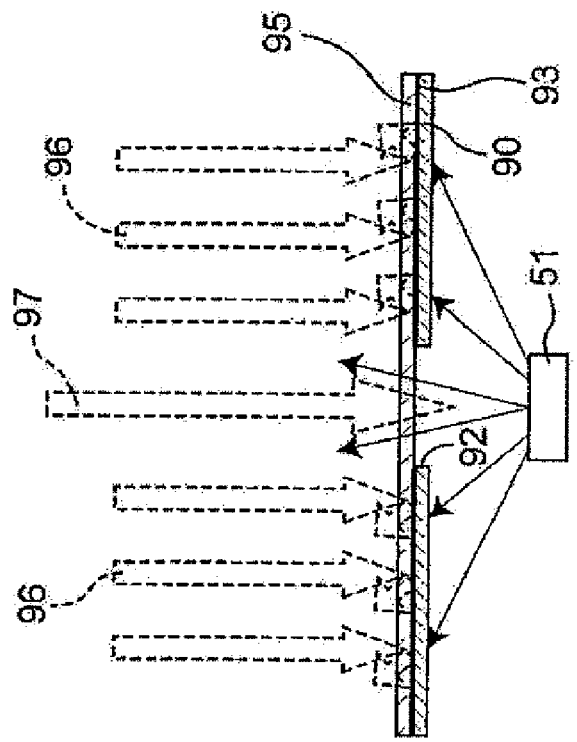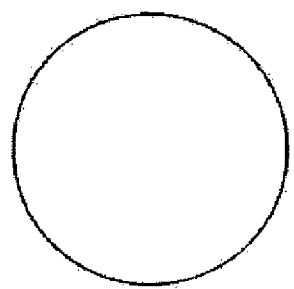
Fig. 15A
Fig. 15B
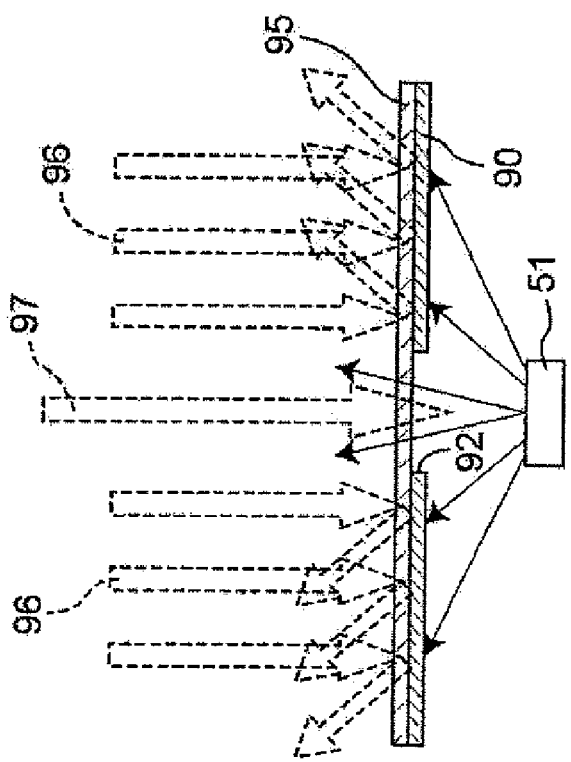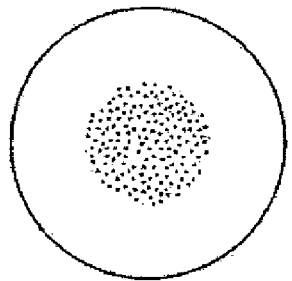
Fig. 15C
Fig. 15D

Fig. 18A                    Fig. 18B
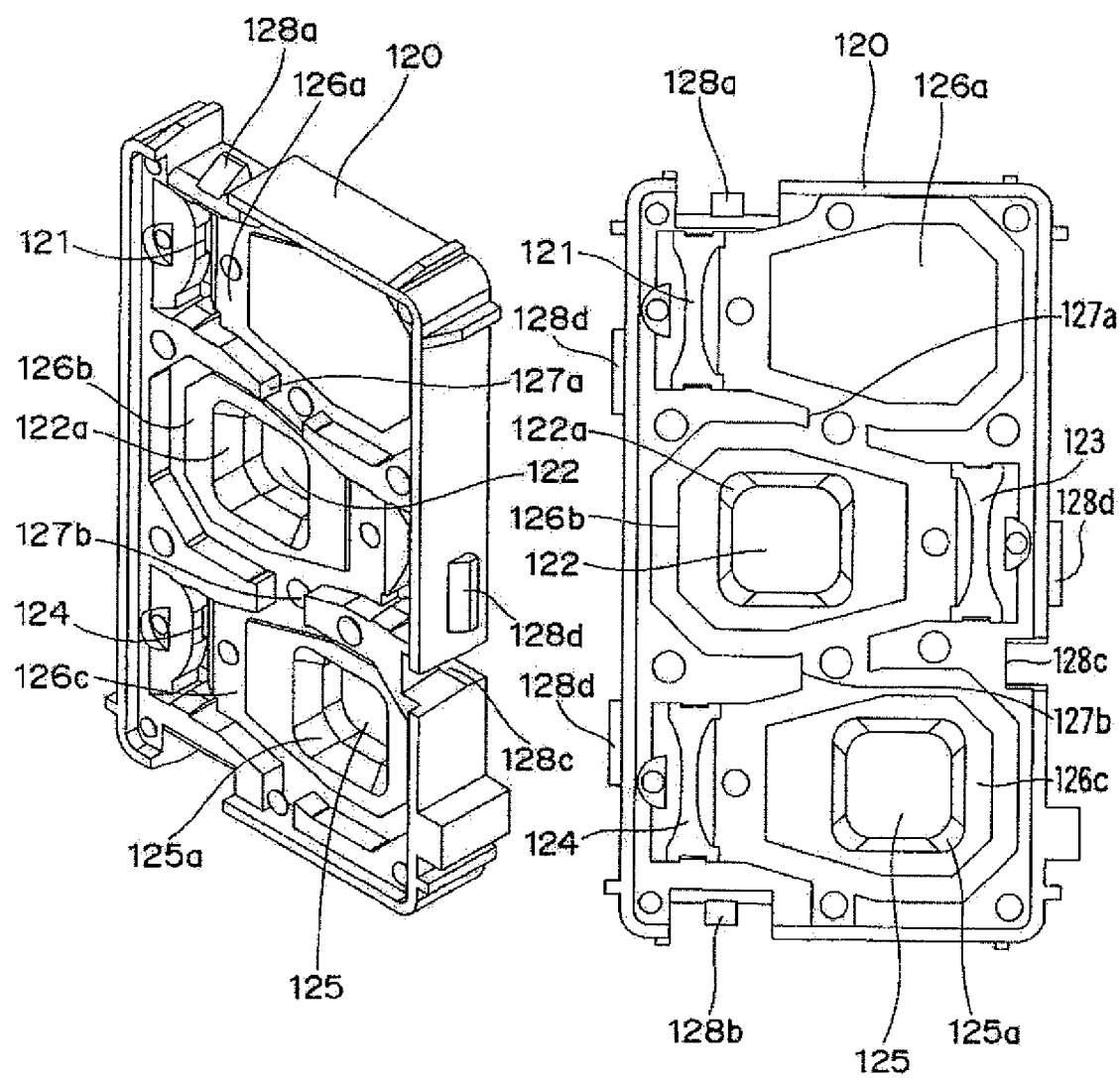

Fig. 20B
Fig. 20A
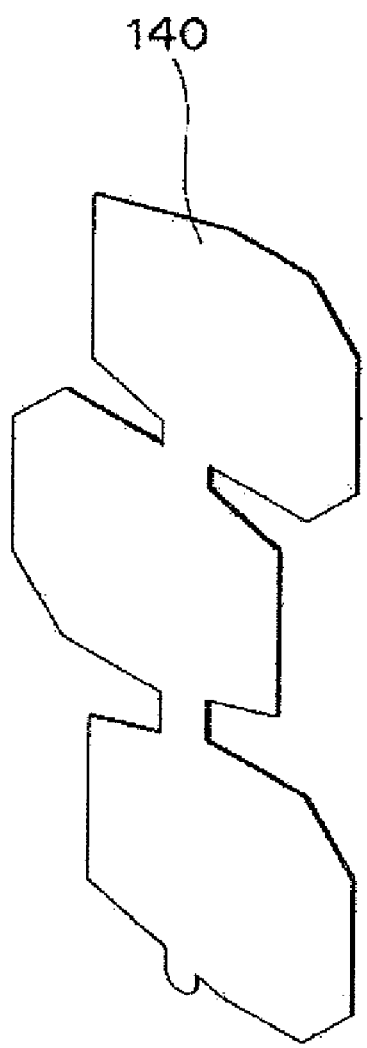
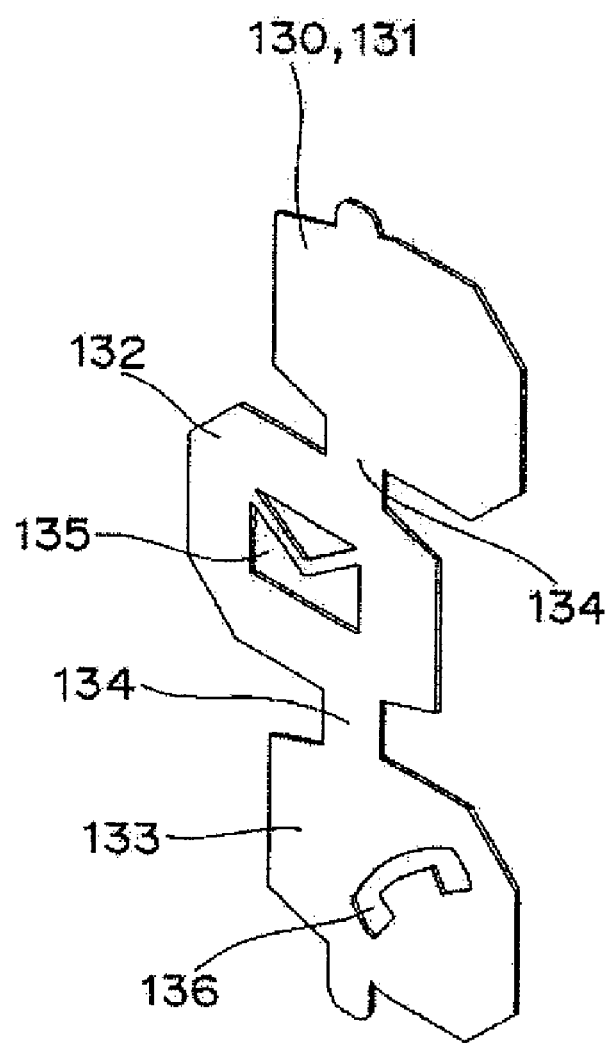

DISPLAY UNIT

TECHNICAL FIELD

The present invention relates to a display unit, and particularly, concerns a display unit with a switching function.

BACKGROUND ART

For example, a light dot type display unit (see Patent Document 1) has been known as a conventional display unit, in which a plurality of reflective dots, which are made of fine concave sections, and have a light transmitting property, are formed with a plurality of light guide plates each of which has a light source placed on its one side being placed in parallel therewith, so that a plurality of display members are displayed simultaneously or alternately.

Patent Document 1: Patent No. 3503608

DISCLOSURE OF THE INVENTION

Problems to be Solved by the Invention

However, as shown in FIG. 1 of Patent Document 1, the light dot type display unit requires different substrates on which a plurality of light sources are installed in parallel therewith. For this reason, a number of parts are required and a number of assembling processes are also required. Moreover, in the above-mentioned light dot type display unit, a light source has to be placed on a narrow side end face of a light guide plate with high positioning precision; however, it is not possible to easily carry out the assembling process with high positioning precision, and the subsequent problems are time-consuming positioning processes and low productivity.

In order to solve the above-mentioned problems, the objective of the present invention is to provide a display unit that can be easily assembled with high assembling precision, and has high productivity, with a reduced number of parts and a reduced number of assembling processes.

Means to Solve the Problems

In order to solve the problems, a display unit of the present invention is designed so that by allowing light rays from a light source to be made incident on at least one or more transparent display plates and reflected by fine dimples placed on at least one surface of each of the transparent display plates, a pattern of characters, graphics, symbols or the like is made visually observed uniformly.

In particular, the display unit of the present invention is further provided with transparent electrode plates sandwiched between a plurality of transparent display plates, and is designed so that by allowing light rays from a plurality of light sources respectively placed on the surface and back surface of each of the electrode plates to be made incident on a side end face of each of the transparent display plates and reflected by a number of fine dimples placed on at least one surface of each of the transparent display plates, a pattern of characters, graphics, symbols or the like is made visually observed uniformly.

Effects of the Invention

According to the present invention, only by stacking transparent electrode plates on a transparent display plate or only by sandwiching transparent electrode plates by a plurality of transparent display plates, a light source is easily position-determined on a side end face of each of the transparent display plates. For this reason, a simple assembling process is achieved with high assembling precision so that high productivity is obtained. Moreover, since it is only necessary to place light sources respectively on surface and back surface end portions of one electrode plate, it is possible to obtain a display unit in which the number of parts and the number of assembling processes are reduced.

According to the present invention, the display unit is designed so that, onto side end faces of at least one or more transparent display plates stacked on an electrode plate, light rays from a light source placed on the electrode plate are respective made incident, and reflected by many fine dimples placed on at least one surface of each of the transparent display plates so that a pattern of characters, graphics, symbols or the like is made visually observed uniformly.

In accordance with the present invention, only by stacking a plurality of transparent display plates on one electrode plate, with light sources being disposed thereon, each light source can be easily position-determined on a side end face of each of the transparent display plates. For this reason, a simple assembling process is achieved with high assembling precision so that high productivity is obtained. Moreover, since light rays can be applied to a plurality of electrode plates simply by placing a light source on one electrode plate, it is possible to obtain a display unit in which the number of parts and the number of assembling processes are reduced.

In still another aspect of the present invention, a light guide unit that receives light from a light source placed on the electrode plate, and directs the light to a side end face of the transparent display plate may be installed on one side end portion of the transparent display plate.

According to this arrangement, light leakage is eliminated, and since all the light rays from the light source can be utilized to display a pattern of characters, graphics, characters or the like, it becomes possible to obtain a display unit with high efficiency.

In still another aspect of the present invention, a light diffusion sheet and a light-shielding mask having punch-out holes used for displaying a pattern of characters, graphics, symbols and the like may be placed between the transparent display plate placed closest to the electrode plate and the electrode plate, with a light source for the pattern being placed at a position facing the punch-out holes of the light-shielding mask.

According to this aspect, by applying light not only from the side end face of the transparent display plate, but also from the lower most face thereof, displaying processes of various kinds and various modes can be obtained through the light-shielding mask having punch-out holes.

In still another aspect of the present invention, the reflective face of the light-shielding mask may have a low reflectance.

In accordance with this aspect, the difference between the brightness of the area with the punch-out holes for forming a pattern and the brightness of the other areas is made smaller so that a so-called black void hardly occurs and characters and the like can be displayed uniformly.

In still different aspect of the present invention, the transparent display plate may be exchangeable.

In accordance with this aspect, characters and the like to be displayed can be altered conveniently on demand.

In still another aspect of the present invention, the dimples of at least one transparent display plate may be randomly arranged.

In accordance with this aspect, by randomly arranging the dimples of the transparent display plate, it becomes possible to eliminate light interference between opposing transparent display plates. For this reason, light emitted from the light source can be diffused uniformly so that characters and the like can be displayed with uniform brightness.

In still another aspect of the present invention, a control circuit that detects a change in an electrostatic capacity between the electrode formed on the electrode plate and a reference electrode, and on-off controls the light source may be installed.

In accordance with this aspect, it becomes possible to obtain a display unit that is provided with a switching function, and also has the above-mentioned effects combinedly.

A display unit according to still another aspect of the present invention may have a diffusion sheet and at least one or more transparent display plates that are successively placed on a face on the side to be visually observed of a light-shielding mask having punch-out holes used for displaying a pattern of characters, graphics, symbols and the like, and light from the light source may be made incident on the side end face of the transparent display plate and reflected by a number of fine dimples formed on at least one of faces of the transparent display plate so as to be visually observed, while light from the light source placed at the position facing the punch-out holes of the light-shielding mask is allowed to pass through the punch-out holes and the transparent display plate so as to be visually observed.

In accordance with the present invention, simply by successively stacking a diffusion sheet and transparent display plates on a light-shielding mask having punch-out holes, a display unit capable of carrying out displaying processes of various kinds and various modes can be obtained. For this reason, the display unit can be assembled easily with high assembling precision, and high productivity is achieved. Moreover, since the pattern of the light-shielding mask can be displayed within the transparent display plate in a superposed manner, it is possible to obtain a display unit capable of carrying out displaying processes of various kinds and various modes, by using a small number of parts and a small number of assembling processes.

In still another aspect of the present invention, diffusion sheets may be placed on the surface and back surface of the light-shielding mask.

In accordance with this aspect, by utilizing two diffusion sheets so that light rays can be diffused more uniformly, a displaying process can be carried out, with the existing positions of the light sources being made unrecognizable. In particular, even in the case when a sufficient diffusion distance is not maintained because of thinness of the unit, light rays are diffused uniformly so that a displaying process can be carried out, with the existing positions of the light sources being made unrecognizable.

In still another aspect of the present invention, a diffusion sheet may be placed on the light-shielding mask on the surface side to be visually observed, with a diffusion lens being placed on the back surface side of the light-shielding mask.

In accordance with this aspect, even in the case when a sufficient diffusion distance is not maintained because of thinness of the unit, light rays are diffused uniformly through the diffusion sheet and the diffusion lens so that a displaying process can be carried out, with the existing positions of the light sources being made unrecognizable.

In still different aspect of the present invention, a light guide unit, which receives light from a light source placed on the electrode plate, and directs the light to a side end face of the transparent display plate, may be installed at least on one side end portion of the transparent display plate.

According to this aspect, light leakage is eliminated, and since uniform light rays from the light source or all the light rays therefrom can be utilized to display a pattern of characters, graphics, symbols or the like, it becomes possible to obtain a display unit with high efficiency.

In still another aspect of the present invention, a diffusion unit may be placed between the light guide unit of the transparent display plate and fine dimples, and by diffusing light rays from the light sources by using the diffusion unit, a pattern of characters, graphics, symbols or the like can be made visually observed uniformly.

According to this aspect, by diffusing light rays in the diffusion unit, it becomes possible to restrain luminance irregularities and luminance lines, and consequently to provide a uniform pattern display of characters, graphics, symbols and the like. Moreover, by combining the display of the transparent display plate of its own with the pattern of the light-shielding mask displayed by light rays that have passed through its punch-out holes, it becomes possible to carry out displaying processes of various kinds and various modes.

In still another aspect of the present invention, the face of the light-shielding mask to be visually observed may have a low reflectance.

According to this aspect, the difference between the brightness of the area with the punch-out holes for forming a pattern and the brightness of the other areas is made smaller so that a so-called black void hardly occurs and characters and the like can be displayed uniformly.

In still another aspect of the present invention, the transparent display plate may be exchangeable.

With this arrangement, characters and the like to be displayed can be altered conveniently on demand.

In the other aspect of the present invention, the dimples may be randomly arranged.

According to this aspect, by randomly arranging the dimples of the transparent display plate, it becomes possible to eliminate light interference between opposing transparent display plates. For this reason, light emitted from the light source can be diffused uniformly, and characters and the like can be displayed with uniform brightness.

BRIEF DESCRIPTION OF THE DRAWINGS

FIGS. 2A and 2B are a left side view and a front view showing a substrate shown in FIG. 1.

FIG. 9A is a front view of the second embodiment, and FIG. 9B is a cross-sectional view taken along line B-B of FIG. 9A.

FIG. 11A is a semi-front view of the third embodiment, and FIG. 11B is a cross-sectional view taken along line B-B of FIG. 11A.

FIGS. 15A and 15B are a cross-sectional view that shows a state in which so-called black voids occur and a plan view that shows the state with black voids, and FIGS. 15C and 15D are a cross-sectional view that shows a state in which no black voids occur and a plan view that shows the state without black voids.

FIGS. 18A and 18B are a perspective view and a front view that show a surface side of a base shown in FIG. 16.

FIGS. 20A and 20B are perspective views of a light shielding mask and a diffusion sheet shown in FIG. 16.

REFERENCE NUMERALS

Figure 1:
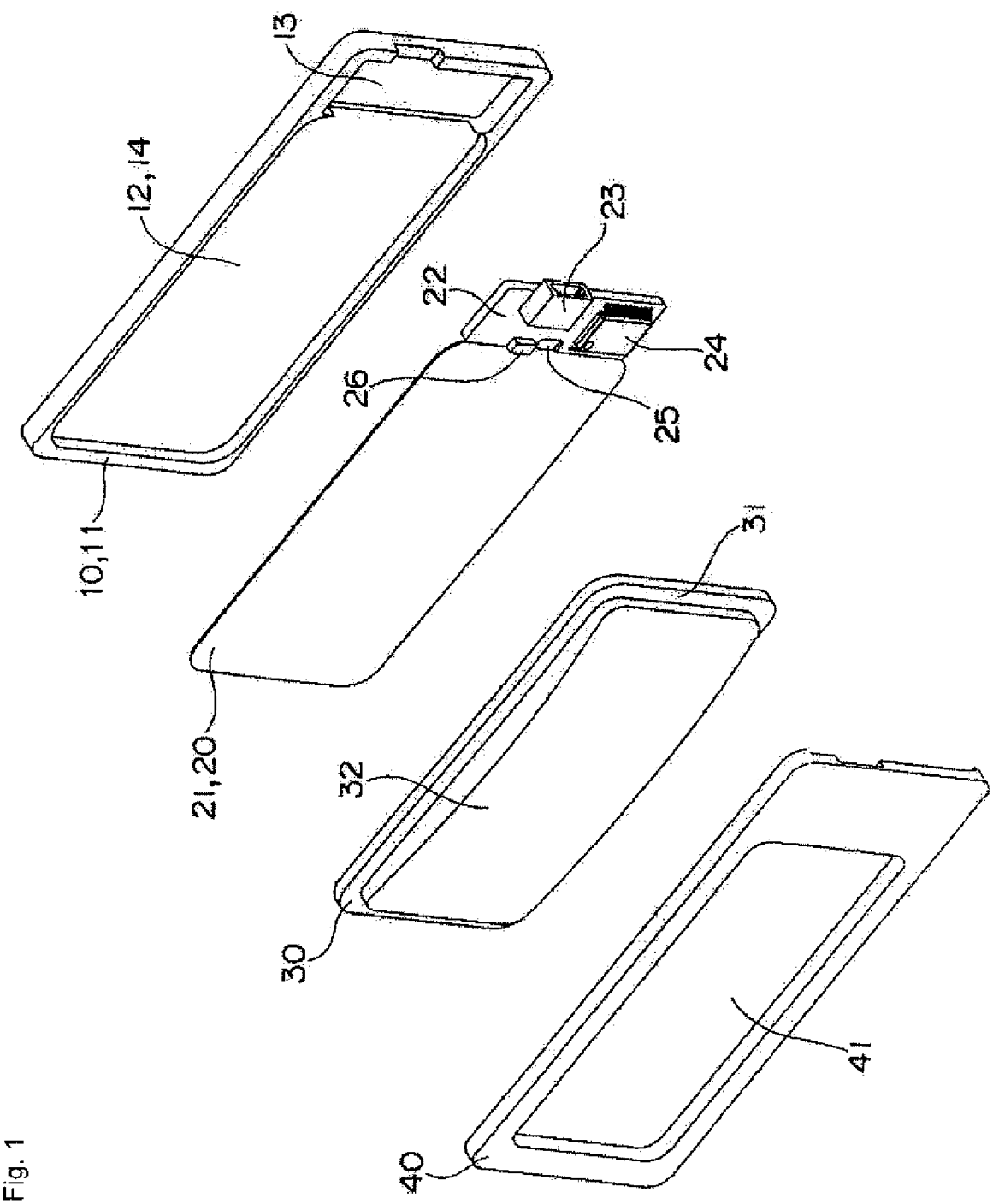
FIG. 1 is an exploded perspective view that shows a first embodiment of a display unit according to the present invention.

10: First display plate
11: Annular rib
12: Housing concave section
13: Housing concave part
14: First display portion
20: Electrode plate
21: Transparent electrode plate main body
22: Printed substrate
23: Connector
24: Controlling IC chip
25: First LED
26: Second LED
30: Second display plate
31: Annular step portion
32: Expanded portion
33: Positioning cut-out portion
40: Cover
41: Opening portion
50: Transparent electrode plate
51, 52, 53: First, Second, Third LEDs
60: First display plate
61: Light guide unit
62: Positioning cut-out portion
70: Second display plate
71: Light guide unit
80: Cover
81: Opening portion
82: Positioning protrusion
90: Light shielding mask
91: Punch-out hole
93: Thin film
95: Light diffusion sheet
99: Dimple
100: Printed substrate
111 to 115: First to Fifth LEDs
120: Base
121, 123, 124: First, Second, Third light guide groove
122, 125: First, Second light guide hole
121a to 125a: Tapered faces
130: Light shielding mask
131, 132, 133: First, Second, Third light shielding portion
135, 136: Punch-out hole
140: Diffusion sheet
151, 152, 153: First, Second, Third transparent display plate
151a, 152a, 153a: Light guide unit
160: Cover
161, 162, 163: First, Second, Third opening portion
170, 171: Diffusion sheet
172: Diffusion lens

BEST MODE FOR CARRYING OUT OF THE INVENTION

Referring to attached FIGS. 1 to 29, the following description will discuss preferred embodiments of the present invention.

The first embodiment relates to a structure in which the present invention is applied to a display unit with a switching function, and as shown in FIGS. 1 to 7, this structure is provided with a first display plate 10 that functions as a base, an electrode plate 20, a second display plate 30 and a cover 40.

Figure 4A:
FIGS. 4A, 4B and 4C are partial front views that shows one example of a display state according to the first embodiment.
Figure 4B:
Figure 5A:
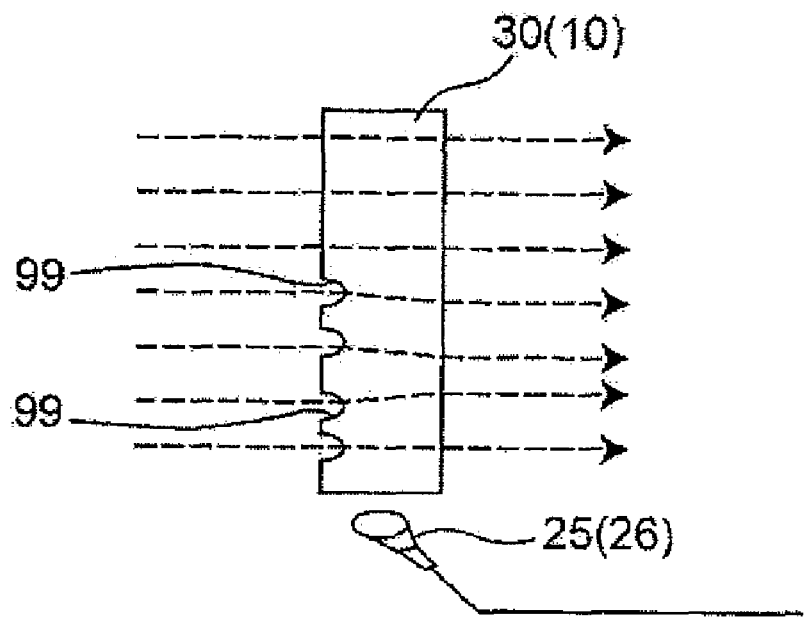
FIGS. 5A and 5B are cross-sectional views that show light transmitting states of a display plate shown in FIG. 1.
Figure 5B:
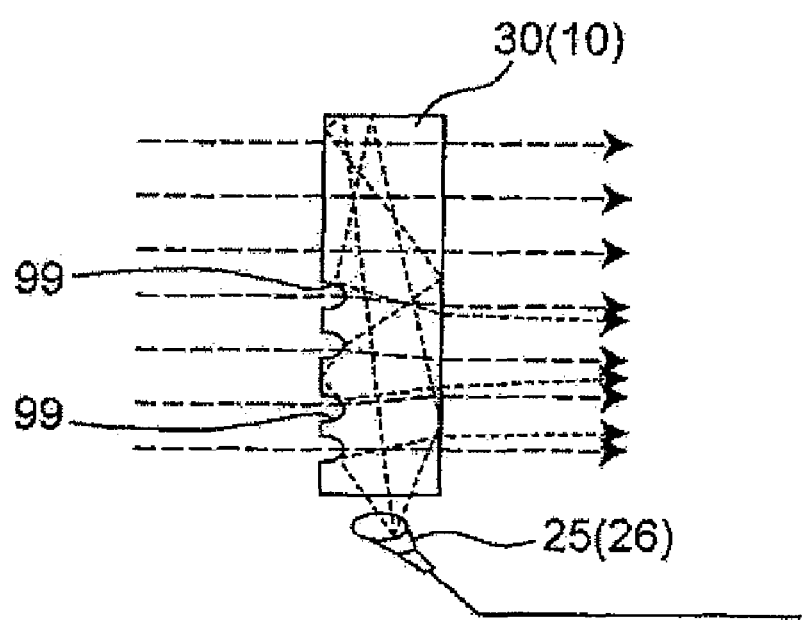

The first display plate 10 is a molded product, made from a transparent acrylic resin and polycarbonate resin, which may be prepared as an elastic member having a flexible property. The first display plate 10 has a structure in which a housing concave section 12 and a housing concave part 13 that is lower than the housing concave section 12 by one step are formed within an annular rib 11 that is formed on the outer peripheral edge portion on its one surface. Moreover, the first display plate 10 allows the bottom face of the housing concave section 12 to serve as a first display portion 14. Furthermore, as shown in FIG. 5, a number of fine dimples 99, which are hardly recognizable by the human visual sense, are placed on one surface of the first display portion 14 in a manner so as to allow, for example, characters, "ON SALE", to appear thereon. For this reason, upon incident of light in the thickness direction of the first display portion 14, the light is allowed to pass through it without being reflected off the dimples 99 so that the first display plate 10 looks transparent (FIG. 4A). However, in the case when light is made incident on the side end face of the first display plate 10 from a first LED 25, which will be described later, the light is reflected off the dimples 99 to be scattered so that the characters, "ON SALE", are allowed to appear thereon (FIG. 4B).

The electrode plate 20 is constituted by a transparent electrode plate main body 21 having a plane shape that can be fitted to a housing concave section 12 of the first display plate 10 and a printed substrate 22 electrically connected to one side end portion of this transparent electrode plate main body 21. A connector 23 and a controlling IC chip 24 are assembled on one of the faces of the printed substrate 22. Here, the controlling IC chip 24 is provided with an input/output circuit that detects a change in electrostatic capacity between an electrode pattern (not shown) formed on the electrode plate 20 and a reference electrode having a potential of GND or the like so as to output an on/off signal, and a control circuit that controls lighting processes of first and second LEDs 25 and 26, which will be described later. Moreover, the printed substrate 22 has a structure in which the first LED 25 is embedded into a cut-out portion formed on an end portion of its one side face to be electrically connected, with the second LED 26 being packaged on the one side face end portion.

Figure 3A:
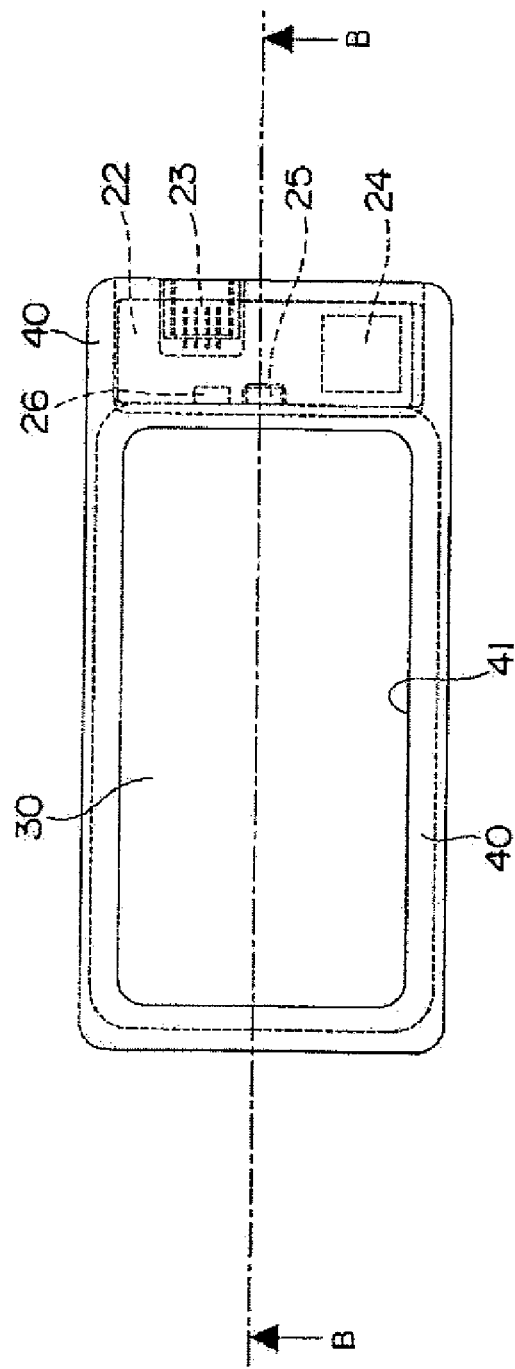
FIG. 3A is a front view of the display unit shown in FIG. 1.
Figure 3B:
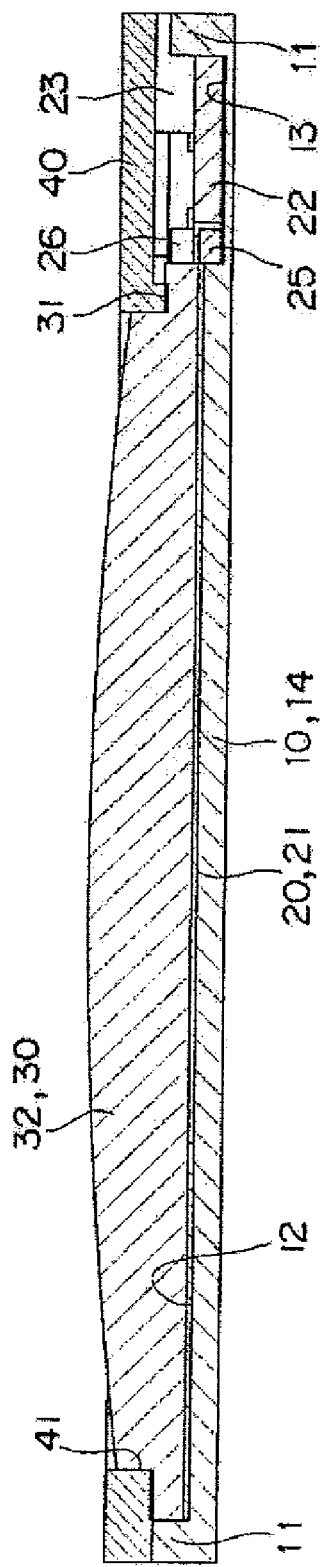
FIG. 3B is a cross-sectional view taken along line B-B of FIG. 3A.

Moreover, the transparent electrode plate main body 21 and the printed substrate 22 are respectively fitted to the housing concave sections 12 and the housing concave part 13 of the first display plate 10 to be positioned therein so that the first LED 25 is made in contact with the one side end face of the first display portion 14 (FIG. 3B).

Figure 4C:
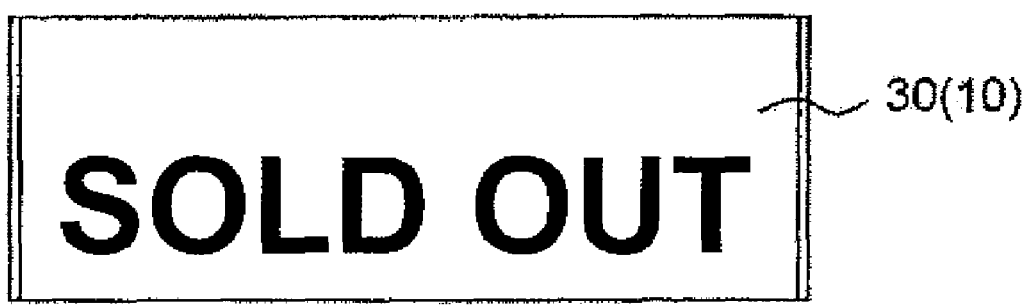

A second display plate 30 has a plane shape that can be fitted to the housing concave section 12 of the first display plate 10, with an expanded portion 32 being formed inside an annular step portion 31 formed on the peripheral edge portion of one of its faces. Moreover, as shown in FIG. 5, in the same manner as in the first display plate 10, the second display plate 30 is provided with a number of fine dimples 99 that are hardly recognizable by the human visual sense so that characters, for example, "SOLD OUT", are allowed to appear thereon. For this reason, upon incident of light in the thickness direction of the second display portion 30, the light is allowed to pass through it without being reflected off the dimples 99 so that the second display plate 30 looks transparent (FIG. 4A). However, in the case when light from the second LED 26 is made incident on the side end face of the second display plate 30, the light is reflected off the dimples 99 to be scattered so that the characters, "SOLD OUT", are allowed to appear thereon (FIG. 4C).

Here, by fitting the second display plate 30 to the housing concave section 12 of the first display plate 10 so as to be positioned therein, the second LED 26 is made in contact with the one side end face of the second display plate 30 (FIG. 3B).

A cover 40, which has a plane shape that can cover the surface of the first display plate 10, is provided with an opening portion 41 to which the expanded portion 32 of the second display plate 30 can be fitted.

By attaching the cover 40 to the first display plate 10 to be secured therein, the electrode plate 20 and the second display plate 30 are sandwiched by the first display plate 10 and the cover 40, with the expanded portion 32 of the second display plate 30 being exposed to the opening portion 41 of the cover 40.

Figure 6A:
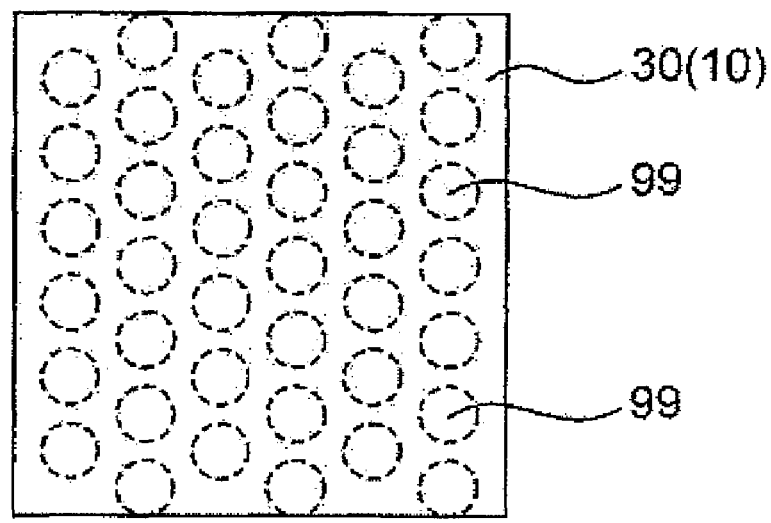
FIGS. 6A and 6B are front views that show dimples of the display plate.
Figure 6B:
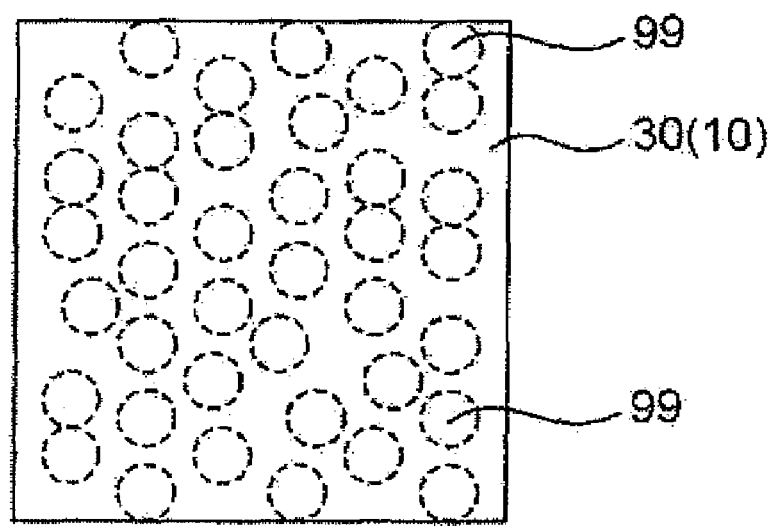

The dimples 99 to be formed on the first and second display plates 10 and 30 need to be arranged so that a predetermined pattern, such as characters, symbols and graphics, is allowed to appear, and within the arranged area, those dimples may be arranged regularly as shown in FIG. 6A, or may be arranged randomly as shown in FIG. 6B. In the case when they are arranged in a lattice shape regularly, light that has passed through the first display plate 10 interferes with the second display plate 30 to cause a partial reduction in luminance and the subsequent difficulty in displaying characters or the like uniformly in some cases. However, by arranging the dimples 99 randomly, it is possible to avoid the problems due to light interference. Moreover, in order to avoid these problems, the shape, pitch and the like of the dimples may be made different from one another.

Moreover, by placing a dot pattern on one of the faces of each of the first and second display plates 10 and 30, the dimples may be made hardly recognizable. By placing a stripe pattern thereon, the dimples may be made to be easily viewed and different in tastes. Furthermore, a liquid crystal screen may be placed on the lowermost face side so as to display animations thereon. Here, all the LEDs are not necessarily placed on the printed substrate 22, and for example, the second LED 26 may be placed on the end portion on the longer side of the second display plate 30.

Next, the following description will discuss operations of the display unit.

Figure 7A:
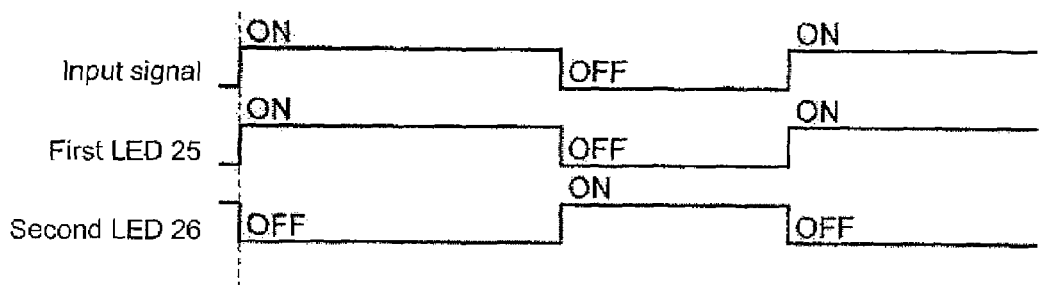
FIGS. 7A, 7B, 7C and 7D are time charts that explain an operation method of the first embodiment.

For example, upon application as a display unit, as shown in FIG. 7A, only the first LED 25 is turned on during the on-state of the input signal, and light is made incident on the end face of its one side of the first display portion 14 so that the characters, "ON SALE", are allowed to appear, informing the user of the fact that it is on sale. During the off-state of the input signal, the first LED 25 is turned off, while the second LED 26 is turned on to allow the characters, "SOLD OUT", to appear thereon, thereby informing the user of the fact that it is sold out, and is not on sale. When the input signal is again turned on, the first LED 25 is turned on, with the second LED 26 being turned off, in the same manner as described above, thereby switching displayed characters.

Figure 7B:
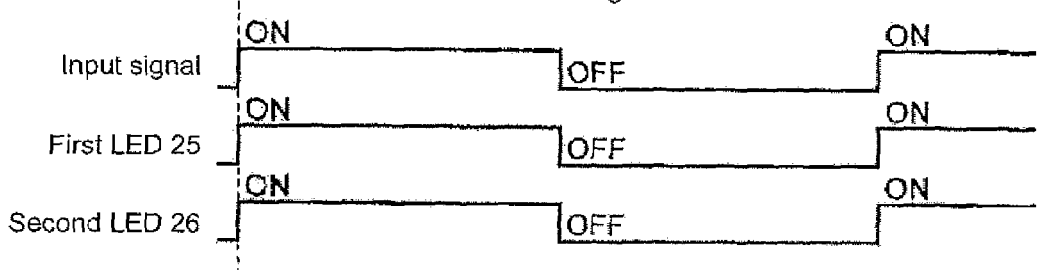

In the display unit according to the present embodiment, not only the above-mentioned displaying process in which the characters are allowed to appear to be displayed, but also a displaying process which displays a desired pattern, such as other characters, graphics and symbols, may be carried out. With respect to the operation method for such a display unit, for example, as shown in FIG. 7B, during the on-state of the input signal, the first LED 25 and the second LED 262 may be simultaneously turned on, while during the off-state of the input signal, the first LED 25 and the second LED 26 may be simultaneously turned off.

Figure 7C:
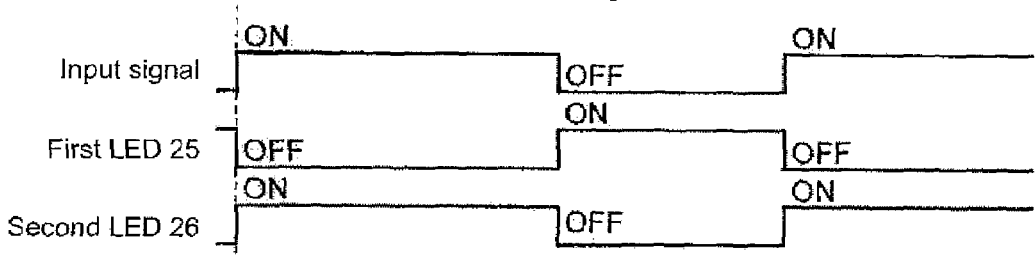

As shown in FIG. 7C, during the on-state of the input signal, the first LED 25 may be turned off, with the second LED 262 turned on. Moreover, upon off-state of the input signal, the second LED 26 may be turned on, while during the off-state of the input signal, the first LED 25 and the second LED 26 may be simultaneously turned off.

Figure 7D:
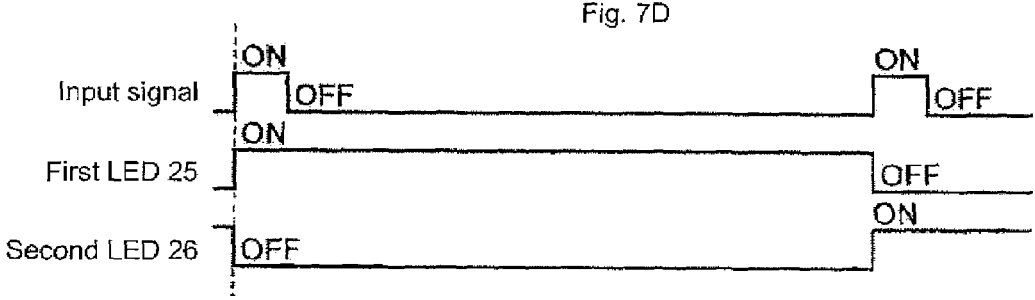

Moreover, with respect to the controlling method in the case when the display unit is used as a display unit with a switching function, for example, as shown in FIG. 7D, by touching the first display plate 30 with a finger, a change in electrostatic capacity between the electrode pattern (not shown) formed on the electrode plate 20 and the reference electrode having a potential of GND or the like is detected by a control circuit IC chip 24 to output an output signal so that the first LED 25 is turned on, while the second LED 26 is turned off. Moreover, by again touching the first display plate 30 with a finger, a change in electrostatic capacity of the electrode plate 20 is detected by the control circuit IC chip 24 so that the output signal to the first LED 25 is stopped to turn it off, while an output signal is given to the second LED 26 to turn it on.

Here, in the above-mentioned operation, by repeating the turning on and turning off of the first LED 25 and the second LED 26 to flicker for every predetermined time interval, different characters and the like may be alternately displayed. Here, the first LED 25 and the second LED 26 are not necessarily set to the same color phase, and for example, a blue LED and a red LED may be used in combination.

Figure 8:
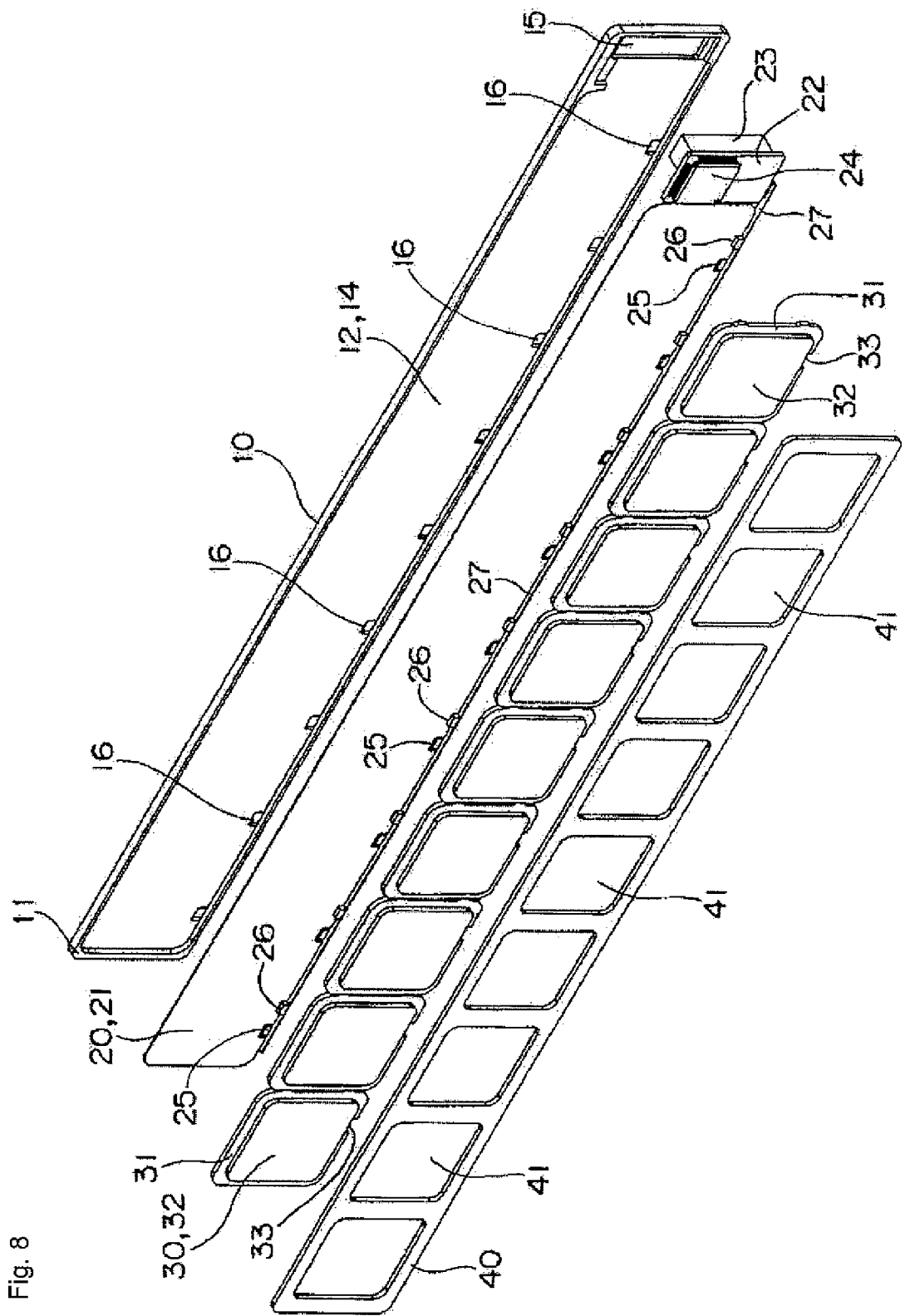
FIG. 8 is an exploded perspective view that shows a second embodiment of a display unit according to the present invention.

The second embodiment relates to a structure in which, as shown in FIGS. 8 and 9, a display unit having a plurality of continuous switching functions is prepared.

That is, the second embodiment is constituted by a first display plate 10 serving as a base, an electrode plate 20, a second display plate 30 and a cover 40.

The first display plate 10 is a molded product, made from a transparent acrylic resin and polycarbonate resin, which may be prepared as an elastic member having a flexible property. The first display plate 10 has a structure in which a housing concave section 12 and a housing through hole 15 are formed within an annular rib 11 that is formed on the outer peripheral edge portion on its one surface. Here, concave sections 16 used for housing the first LED 25 which will be described later are formed on the end portion of the longer side of the housing concave section 12 with predetermined pitches. Moreover, the first display plate 10 allows the bottom face of the housing concave section 12 to serve as a first display portion 14. Furthermore, a number of fine dimples (not shown) are placed on one surface of the area corresponding to, for example, the expanded portion 32 of the second display plate 30, which will be described later, so that, when light is made incident thereon from the side end face, for example, a large "O" is allowed to appear thereon. However, in the case when light is made incident thereon in the thickness direction of the first display portion 14, since the light is allowed to pass without being reflected off the dimples 99, the first display plate 10 looks transparent.

The electrode plate 20 is constituted by a transparent electrode plate main body 21 having a plane shape that can be fitted to a housing concave section 12 of the first display plate 10 and a printed substrate 22 electrically connected to an edge portion of a shorter side of the transparent electrode plate main body 21. The printed substrate 22 has a controlling IC chip 24 packaged on its surface, with a connector 23 being packaged on the back face thereof. Moreover, the transparent electrode plate main body 21 has a structure in which the first LED 25 is embedded into a cut-out portion formed on the edge portion of a longer side, with the second LED 26 being placed on the edge portion of one face of the longer side. Moreover, the first and second LEDs 25 and 26 are electrically connected to the printed substrate 22 through lead lines 27.

Here, the transparent electrode plate main body 21, the connector 23 and the first LED 25 are respectively fitted to the housing concave section 12, the housing through hole 15 and the concave section 16 of the first display plate 10 so as to be positioned therein. Thus, the first LED 25 is made in contact with the end face on one side of the first display portion 14.

The second display plate 30 has a plane shape that can be fitted to the housing concave section 12 of the first display plate 10, and also has a structure in which expanded portions 32 are respectively formed within each of a plurality of annular step portions 31 continuously placed on one of its faces. Moreover, positioning cut-out portions 33 are formed on the edge portions of its one side of the annular step portions 31. Furthermore, in the same manner as in the first display plate 10, each of the expanded portions 32 has a number of fine dimples (not shown) on its inner directed face so that in the same manner as in the first display plate 10, upon incident of light from the side end face, a small "o" is allowed to appear thereon. However, in the case when light is made incident thereon in the thickness direction of the second display plate 30, since the light is allowed to pass without being reflected off the dimples 99, the second display plate 30 looks transparent.

Moreover, by positioning the second display plate 30 onto the housing concave sections 12 of the first display plate 10, the second LED 26 is assembled into the positioning cut-out portions 33 of the expanded portions 32.

A cover 40, which has a plane shape that can cover the surface of the second display plate 30, is provided with a plurality of opening portions 41 with predetermined pitches, to which the expanded portions 32 of the second display plate 30 can be fitted.

By attaching the cover 40 to the first display plate 10 to be secured therein, the electrode plate 20 and the second display plate 30 are sandwiched by the first display plate 10 and the cover 40, with the expanded portions 32 being exposed to the opening portion 41 of the cover 40.

According to the present embodiment, for example, by touching any of the expanded portions 32 of the second display plate 30 with a finger, a change in electrostatic capacity between the electrode pattern (not shown) formed on the electrode plate 20 and the reference potential of GND or the like is detected by a control circuit IC chip 24 to output an output signal only to the first LED 25 to be turned on so that only the large "O" is displayed. Next, by again touching the second display plate 30, a change in electrostatic capacity is detected by the control circuit IC chip 24 so that an output signal is given to the second LED 26 to be turned on so that only the small "o" is displayed. Therefore, by simultaneously turning on the first and second display plates 10 and 30, "⊙" can be displayed. Here, by allowing only one of the LEDs to be turned on, only the larger "O" or the smaller "o" may be displayed with a different color phase.

Figure 10:
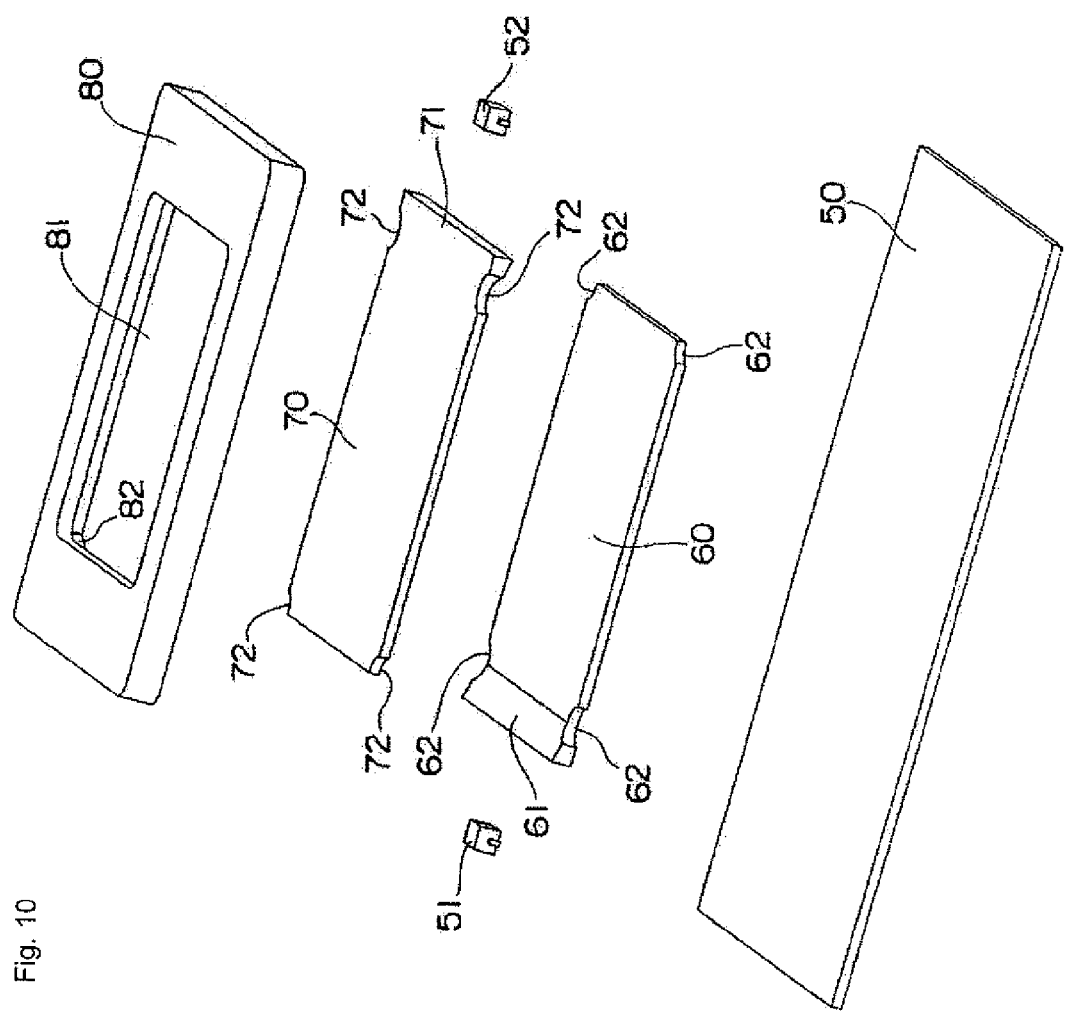
FIG. 10 is an exploded perspective view that shows a third embodiment of a display unit according to the present invention.

As shown in FIGS. 10 and 11, the third embodiment relates to a display unit having a switching function that is provided with a transparent electrode plate 50 functioning as a printed substrate, a first display plate 60, a second display plate 70 and a cover 80. Here, the transparent electrode plate 50 is provided with printed wiring, not shown, and has a structure in which first and second LEDs 51 and 52 are packaged at predetermined positions.

The first display plate 60 is prepared as a square plate made of a transparent resin, which can be packaged on the transparent electrode plate 50, and a light guide unit 61 having a tapered face is formed on its upper face of a shorter side edge portion. Moreover, the first display plate 60 is provided with positioning cut-out portions 62 that are formed on the corner portions of the rest of the shorter sides as well as on edge portions of the two sides of the base portion of the light guide unit 61. Moreover, a number of fine dimples (not shown), which allow patterns, such as characters, symbols and graphics, to appear to be displayed on the lower face of the first display plate 60, are formed thereon. Here, even when light is made incident on the first display plate 60 in the thickness direction, the light is not reflected off the dimples; therefore, the first display plate 60 looks transparent.

In the same manner as in the first display plate 60, the second display plate 70 is prepared as a square plate made of a transparent resin, which can be packaged on the transparent electrode plate 50, and a light guide unit 71 having a tapered face is formed on its lower face of a shorter side end portion. Moreover, the second display plate 70 is provided with positioning cut-out portions 72 that are formed on the corner portions of the rest of the shorter sides as well as on end portions of the two sides of the base portion of the light guide unit 71. Moreover, a number of fine dimples (not shown), which allow patterns, such as characters, symbols and graphics, to appear to be displayed on the lower face of the second display plate 70, are formed thereon. Here, even when light is made incident on the second display plate 70 in the thickness direction, the light is not reflected off the dimples; therefore, the first display plate 70 looks transparent.

A cover 80 has a box shape with a shallow bottom so that, when attached to the transparent electrode plate 50, it is allowed to cover and house the first and second display plates 60 and 70. Moreover, the cover 80 has an opening portion 81 through which the first and second display plates 60 and 70 can be visually observed, and is provided with two pairs of positioning protrusions 82 opposing to each other, which are placed near the corner portions of opposing inner side faces.

Upon assembling the structure of the third embodiment, the first display plate 60 and the second display plate 70 are stacked and position-determined between the first and second LEDs 51 and 52 packaged on the transparent electrode plate 50. Moreover, the cover 80 is secured onto the transparent electrode plate 50 to cover the first display plate 60 and the second display plate 70. Thus, the positioning protrusions 82 of the cover 80 are respectively engaged with the cut-out portions 62 and 72 of the first and second display plates 60 and 70 so that the first and second display plates 60 and 70 are position-regulated. Moreover, the first LED 51 is made in contact with the side end face of the light guide unit 61 of the first display plate 60, while the second LED 52 is made in contact with the side end face of the light guide unit 71 of the second display plate 70.

Consequently, by alternately or simultaneously turning on the first and second LEDs 51 and 52, either one of two kinds of characters or the like is allowed to appear to be displayed thereon, or both of them are allowed to appear to be simultaneously displayed thereon.

As shown in FIGS. 12 to 15, the fourth embodiment relates to a display unit that can display patterns of three kinds of different characters, symbols, graphics or the like.

That is, the display unit has a structure in which the first display plate 60, the second display plate 70 and the cover 80 are successively stacked on the transparent electrode plate 50 on which the first, second and third LEDs 51, 52 and 53 are packaged, with a light-shielding mask 90 and a light diffusion sheet 95 being interposed therebetween. Here, the transparent electrode plate 50 is not necessarily required to be transparent, and, for example, a simple printed substrate may be used.

Figure 14A:
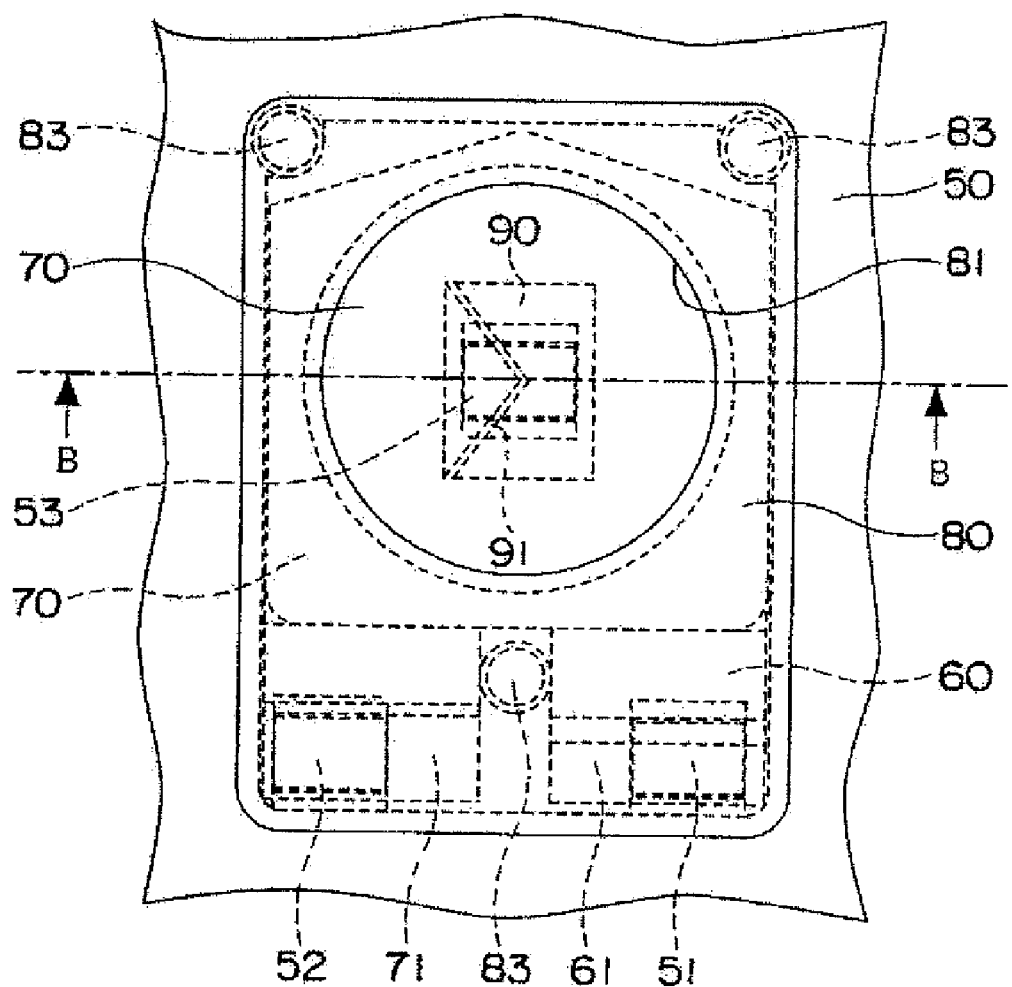
FIG. 14A is a plan view of the display unit shown in FIG. 11.
Figure 14B:
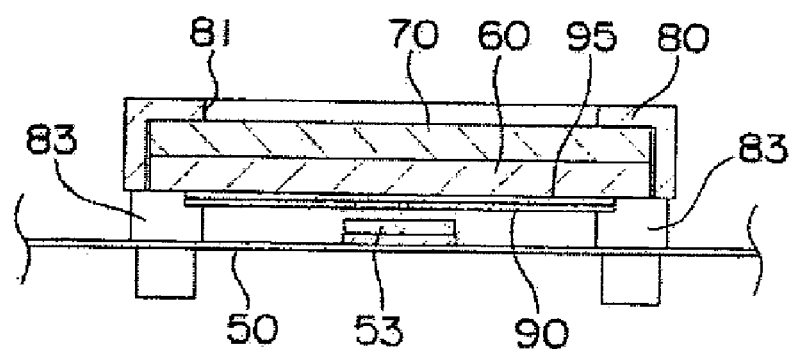
FIG. 14B is a cross-sectional view taken along line B-B of FIG. 14A.

The light-shielding mask 90 is provided with punch-out holes 91 that depict the outline of a pattern of characters, symbols, graphics, or the like, so as to display the pattern of predetermined characters, symbols, graphics, or the like, by using light from the third LED 53. Here, the light-shielding mask 90 is made of a material having a high reflectance, for example, a SUS material. In the present embodiment, the punch-out holes 91 that depict, for example, the external shape of an envelope for displaying an E-mail are formed (FIG. 14A).

In the present embodiment, for example, as shown in FIG. 15C, a thin film 93 is formed so as to lower the reflectance of the surface of the light-shielding mask 90 on the cover 80 side. The reflectance is lowered so as to eliminate a so-called black void.

That is, as shown in FIG. 15A, in the case when the reflectance of the surface of the light-shielding mask 90 on the cover 80 side is high, since all the external light rays 96 that hit the light-shielding mask 90 are reflected, the surface looks bright. In contrast, as shown in FIG. 15C, external light rays 97 are allowed to pass through the punch-out holes 92 of the light-shielding mask 90 to cause less reflected light, with the result that a phenomenon, a so-called black void, occurs (FIG. 15B). When such a black void occurs, the pattern, such as characters, symbols and graphics, which is to be desirably concealed, can be visually observed to cause a problem of obstruction of the view. For this reason, when the thin film 93 used for lowering the reflectance of light is placed on the surface of the light-shielding mask 90 on the cover 80 side, none of the external light rays 96 that hit the thin film 93 of the light-shielding mask 90 are reflected (FIG. 15C). Consequently, the difference between the brightness of the area in which the punch-out holes 92 are formed and the brightness of the other areas is made smaller so that the above-mentioned black void hardly occurs (FIG. 15D).

With respect to the method for forming the thin film used for lowering the reflectance, for example, methods, such as painting, plating, printing and vapor deposition, are proposed. Moreover, with respect to the method for lowering the reflectance without using the thin film, for example, a rough surface is prepared by forming fine irregularities on the surface, or a black material having a low reflectance is used for forming the light-shielding mask. It is most preferable to make the reflectance of the surface of the light-shielding mask 90 on the cover 80 side identical to that of the portion of the punch-out holes 92 of the light-shielding mask; however, it is possible to make the black void hardly occur, by setting the reflectance to 5% or less.

The light diffusion sheet 95, which is used for concealing the punch-out holes 91 and for evenly diffusing light emitted by the LEDs, has the same plane shape as that of the light-shielding mask 90. For example, a polycarbonate film that has been surface-treated is used as the light diffusion sheet 95.

Figure 12:
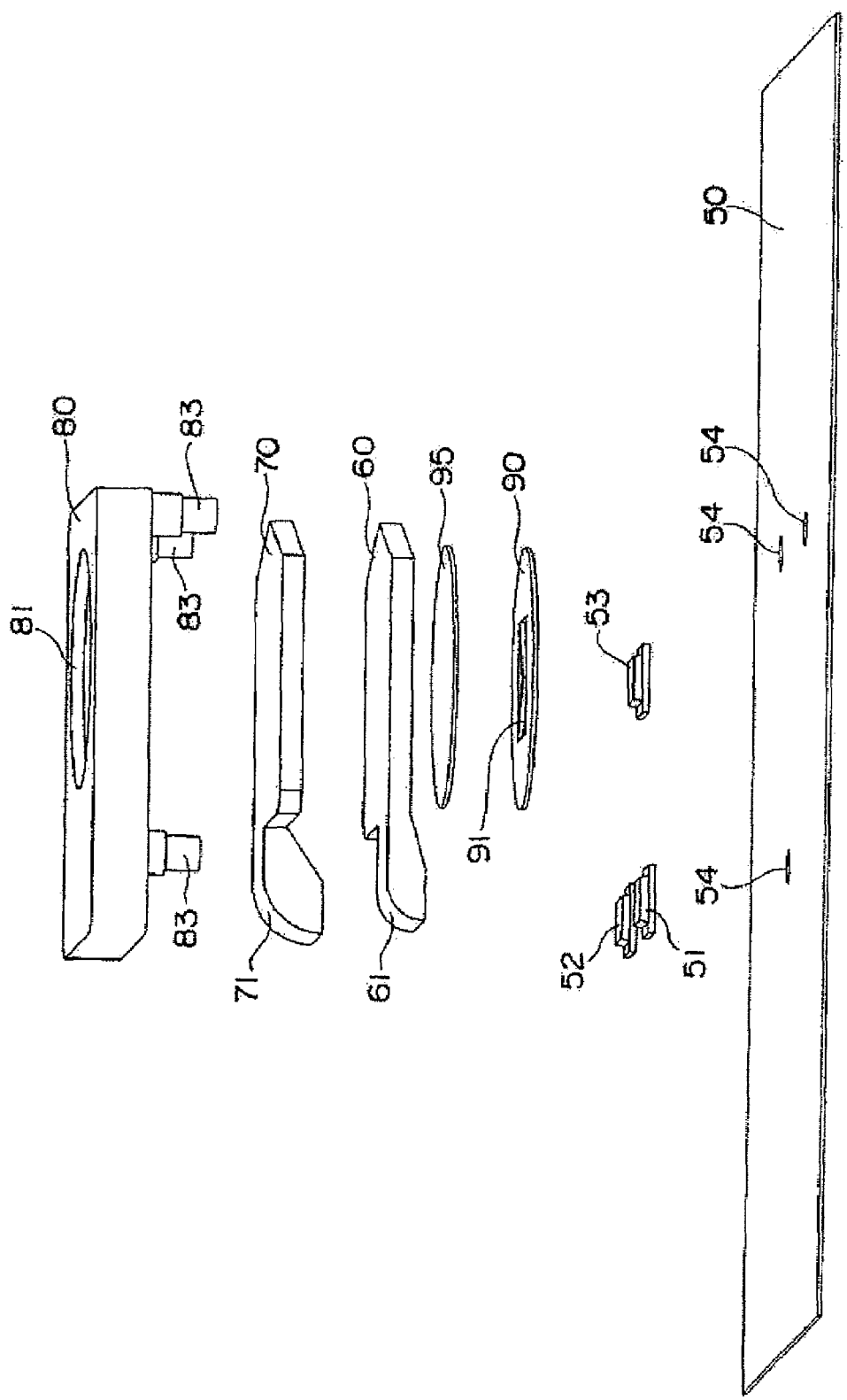
FIG. 12 is an exploded perspective view that shows a fourth embodiment of a display unit according to the present invention.
Figure 13A:
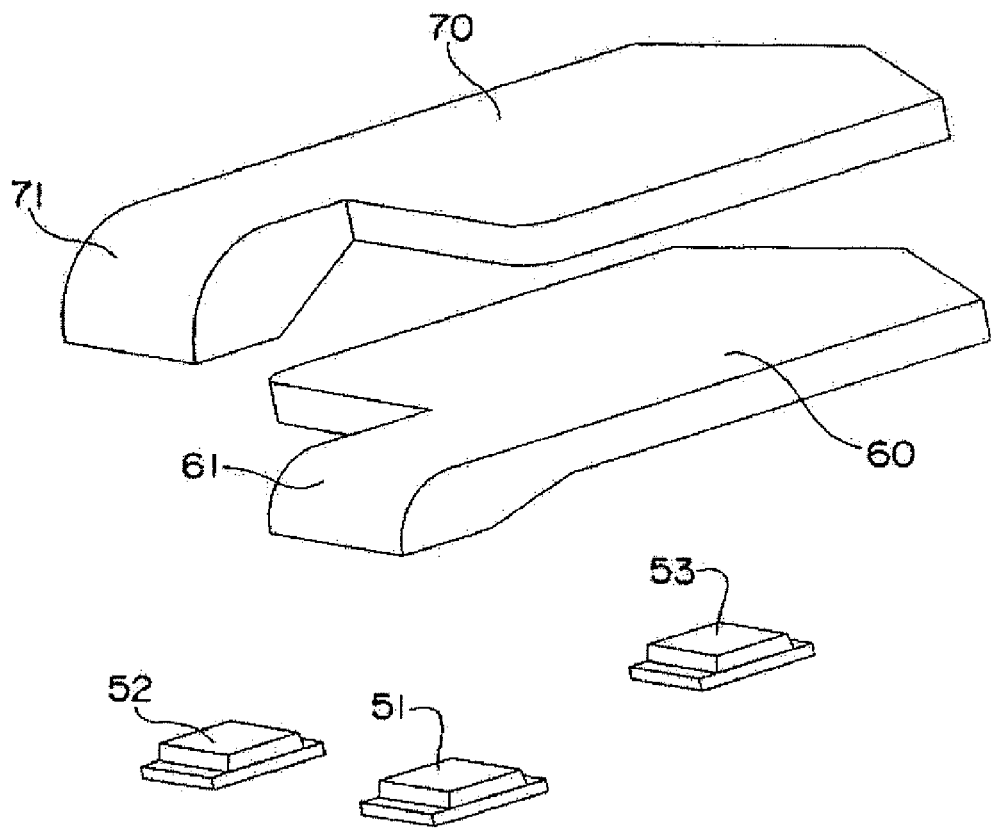
FIG. 13A is an exploded perspective view of essential portion and 13B is a perspective views of essential portion.
Figure 13B:
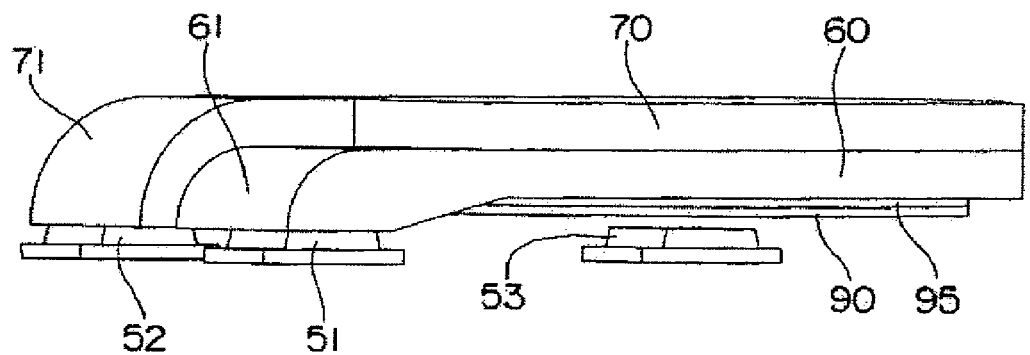

As shown in FIG. 12, the first display plate 60 is prepared as a transparent resin molded product, and has a plane shape capable of covering the light diffusion sheet 95, with a light guide unit 61 being extended from a corner portion on the front side of its one side edge portion. The light guide unit 61 is used for directing light of the first LED 51 emitted in the thickness direction so as to be evenly diffused. Moreover, in the same manner as in the aforementioned embodiment, a number of fine dimples (not shown) are formed on the first display plate 60 so as to prepare an even displaying process by using light directed from the light guide unit 61, or so as to allow a pattern of desired characters, symbols, graphics or the like to appear to be displayed.

The second display plate 70 is prepared as a transparent resin molded product, and has a plane shape capable of covering the light diffusion sheet 95, with a light guide unit 71 being extended from a corner portion on the other side beyond its one side edge portion. The light guide unit 71 is used for directing light of the second LED 52 emitted in the thickness direction so as to be evenly diffused. Moreover, in the same manner as in the aforementioned embodiment, a number of fine dimples (not shown) are formed on the first display plate 70 so as to prepare an even displaying process by using light directed from the light guide unit 71, or so as to allow a pattern of desired characters, symbols, graphics or the like to appear to be displayed.

A cover 80 has a box shape with a shallow bottom so that it is allowed to cover and house the first and second display plates 60 and 70. Moreover, the cover 80 has an opening portion 81 in the center of its bottom face, through which the second and first display plates 70 and 60 can be visually observed, and three leg portions 83 are formed on the bottom face so as to protrude therefrom. The leg portions 83 can be inserted into positioning holes 54 formed on the transparent electrode plate 50.

Upon assembling the structure of the fourth embodiment, the first, second and third LEDs 51, 52 and 53 are packaged on the transparent electrode 50. On the other hand, the second and first display plates 70 and 60, the light diffusion sheet 95 and the light-shielding mask 90 are successively stacked on the lower face of the cover 80 to be formed into an integral unit. Next, the leg portions 83 of the cover 80 are inserted into the positioning holes 54 of the transparent electrode plate 50 to be assembled therein; thus, the first and second LEDs 51 and 52 are respectively made in contact with the lower faces of the light guide units 61 and 71 of the first and second display plates 60 and 70, with the third LED 53 being made to face the lower face of the punch-out holes 91 of the light-shielding mask 90.

According to the present invention, patterns of three kinds of characters, symbols, graphics or the like can be displayed by utilizing the three LEDs, that is, the first, second and third LEDs 51, 52 and 53 so that expressions of various kinds and various modes are available. Moreover, another advantage is that, since all the three LEDs, that is, the first, second and third LEDs 51, 52 and 53, are positioned on the lower sides of the first and second display plates 60 and 70, a display unit requiring only a small floor area can be obtained.

As shown in FIGS. 16 to 25, the fifth embodiment relates to a display unit that can provide an even display through three openings of the cover, or can display patterns of different characters, symbols, graphics or the like therethrough.

That is, the display unit of the present embodiment is constituted by a printed substrate 100, first to fifth LEDs 111 to 115, a base 120, a light-shielding mask 130, a diffusion sheet 140, first, second and third transparent display plates 151, 152 and 153, and a cover 160.

The first to fifth LEDs 111 to 115 are packaged on predetermined positions on the surface of the printed substrate 100, and light reflective films are formed on the surface thereof on demand.

Figures 19A, 19B:
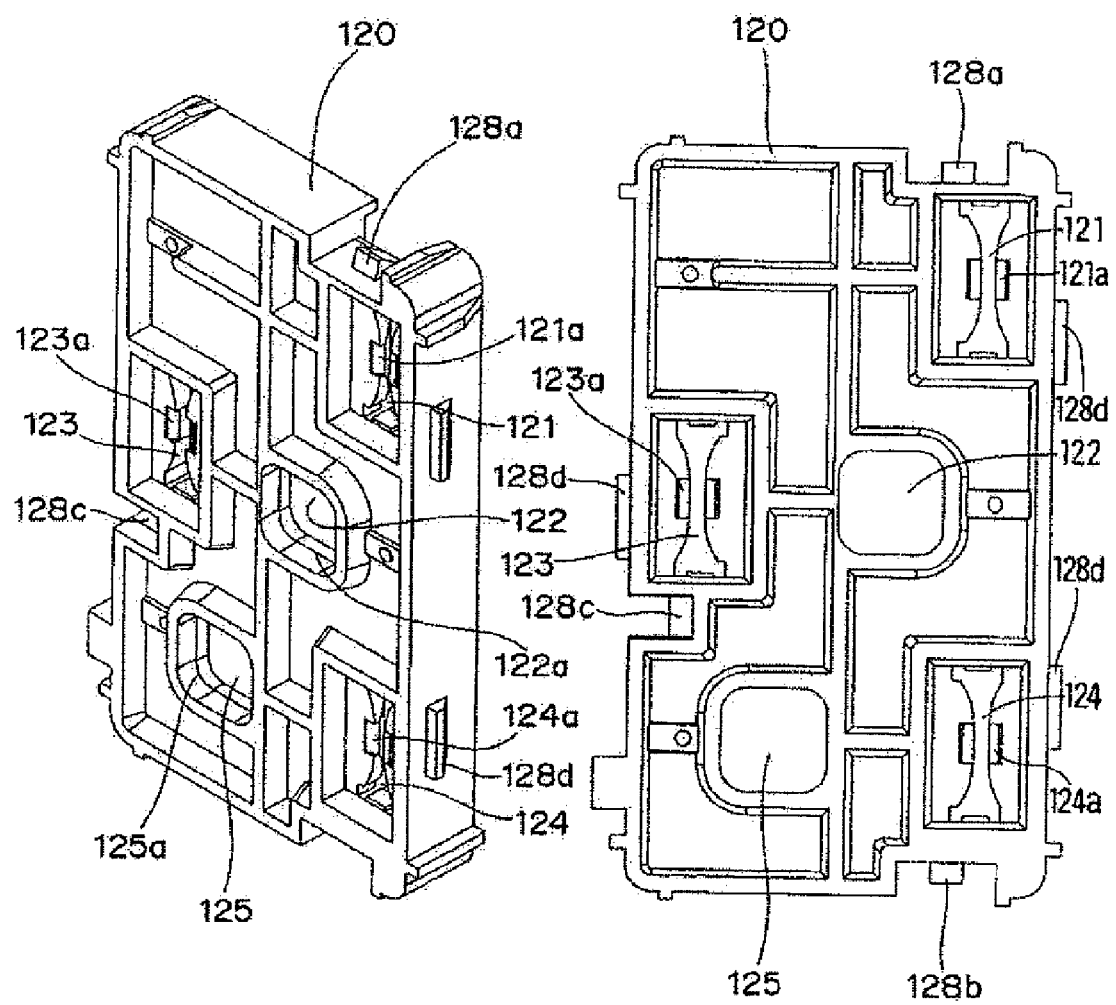
FIGS. 19A and 19B are a perspective view and a bottom view that show a back face side of the base shown in FIG. 16.

As shown in FIGS. 18 and 19, the base 120 is a resin molded product made from a resin material having a high reflectance. Moreover, the base 120 has a plane shape capable of being packaged on the printed substrate 100, and at positions corresponding to the first to fifth LEDs 111 to 115 packaged on the printed substrate 100 thereof, first light guide groove 121, first light guide hole 122, second light guide groove 123, third light guide groove 124 and second light guide hole 125 are respectively formed. Here, pairs of taper faces 121a, 123a and 124a are respectively formed on opening edge portions on the printed substrate 100 side of the first, second and third light guide grooves 121, 123 and 124. In the same manner, annular taper faces 122a and 125a are respectively formed on the opening edge portions on the printed-substrate 100 side of the first light guide hole 122 and the second light guide hole 125. Since the base 120 is made from a resin material having a high reflectance as described earlier, the taper faces 121a to 125a efficiently reflect light from the LEDs to ensure high luminance. Here, the base 120 may be formed by a normal resin material, while reflective films may be formed on the taper faces 121a to 125a. Moreover, on the surface on the cover 160 side of the base 120, first, second and third concave sections 126a, 126b and 126c, used for positioning a light-shielding mask 130 and the like, which will be described later, are formed. The first, second and third concave sections 126a, 126b and 126c are communicated with one another through cut-out grooves 127a and 127b. Moreover, on the outside face of the base 120, first and second engaging claws 128a and 128a and a cut-out groove 128c to be engaged with the cover 160, which will be described later, are formed, with a third engaging claw 128d to be engaged with a housing of another electronic apparatus being formed thereon.

The light-shielding mask 130 is made from an SUS material having a high reflectance, and as shown in FIG. 20(A), is constituted by first, second and third light-shielding portions 131, 132 and 133 having plane shapes capable of being respectively fitted to the first, second, third concave sections 126a, 126b and 126c of the base 120, and coupling portions 134, 134 capable of being fitted to the cut-out grooves 127a and 127b. In particular, punch-out holes 135 that depict the external shape of an envelope used for displaying "an E-mail" are formed on the second light-shielding portion 132. Moreover, punch-out holes 136 that depict the external shape of a telephone receiver used for displaying "a telephone" are formed on the third light-shielding portion 133. In the same manner as in the fourth embodiment, the surface on the cover 160 side of the light-shielding mask 130 is made to have a low reflectance.

That is, with respect to the method for forming the thin film used for lowering the reflectance, for example, methods, such as painting, plating, printing and vapor deposition, are proposed. Moreover, with respect to the method for lowering the reflectance without using the thin film, for example, a rough surface is prepared by forming fine irregularities on the surface, or a black material having a low reflectance is used for forming the light-shielding mask. It is most preferable to make the reflectance of the surface of the light-shielding mask 90 on the cover 80 side identical to that of the portion of the punch-out holes 135 and 136 of the light-shielding mask; however, it is possible to make the black void hardly occur, by setting the reflectance to 5% or less.

As shown in FIG. 20(B), the diffusion sheet 140, which covers the light-shielding mask 130, is provided with a plane shape capable of being fitted to the first, second, third concave sections 126a, 126b and 126c and the cut-out grooves 127a and 127b of the base 120. In accordance with the diffusion sheet 140, by uniformly diffusing light rays from the second and fifth LEDs 112 and 115 that have passed through the punch-out holes 135 and 136, the punch-out holes 135 and 136 are concealed, and the positions of presences of the second and fifth LEDs 112 and 115 are made unrecognizable.

Figure 16:
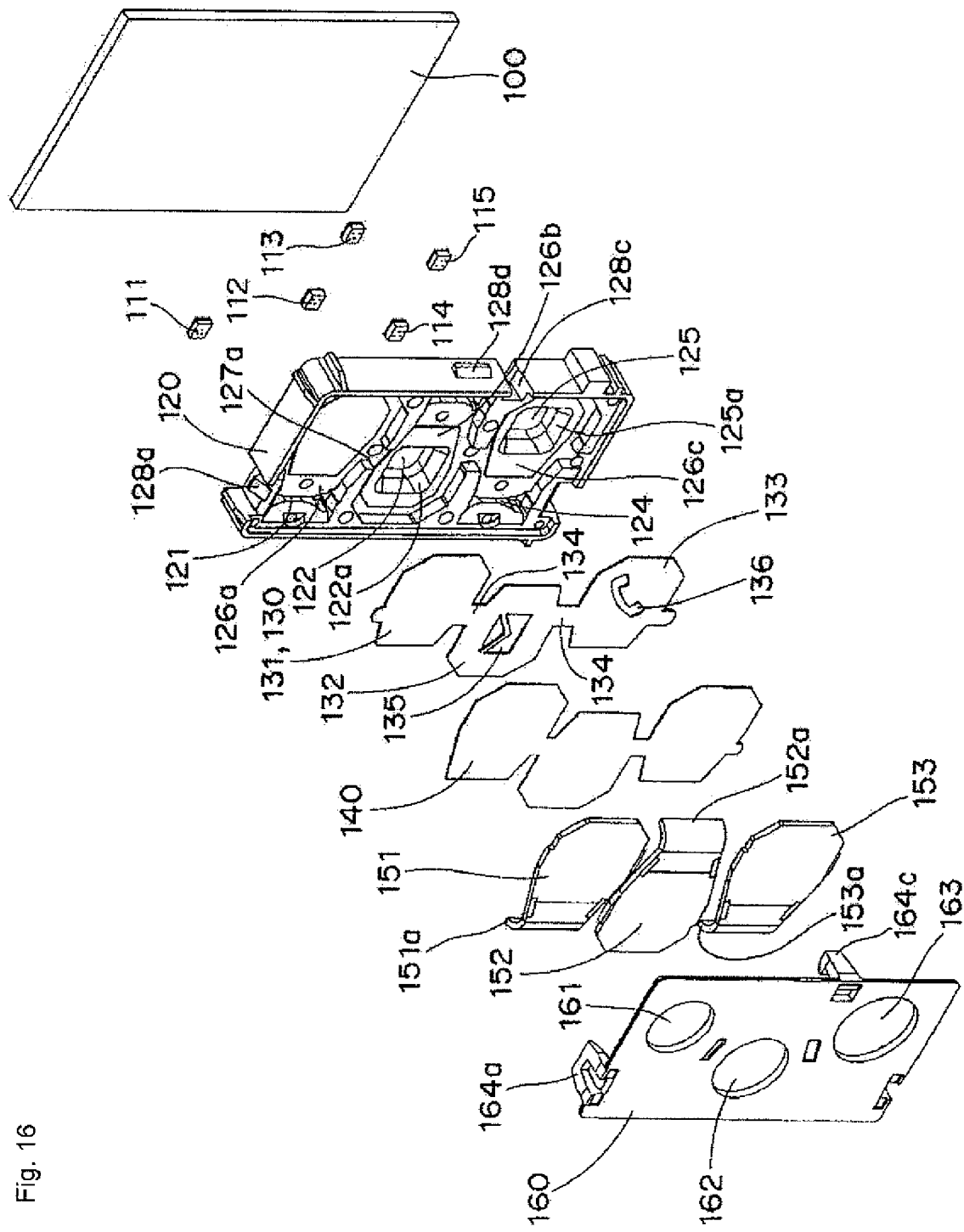
FIG. 16 is an exploded perspective view that shows a fifth embodiment of a display unit according to the present invention.
Figure 21A:
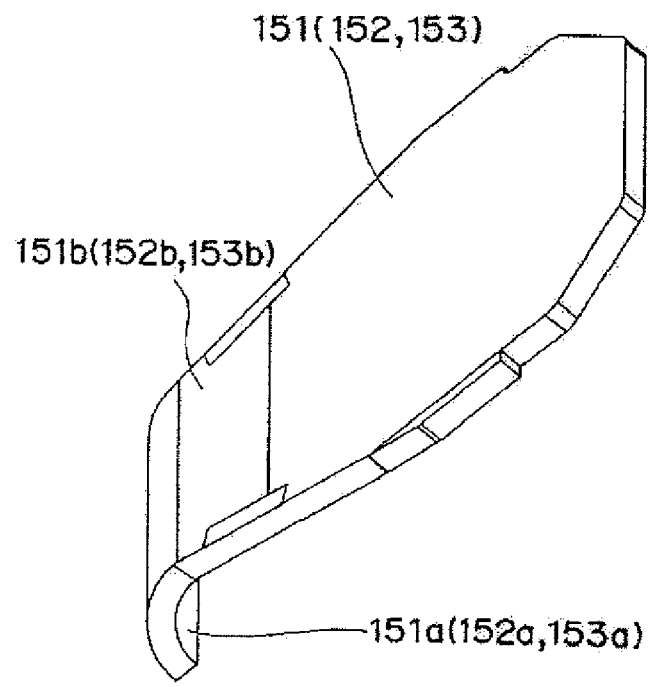
FIGS. 21A and 21B are perspective views obtained when the transparent display plate, shown in FIG. 16, is viewed from different angles.
Figure 21B:
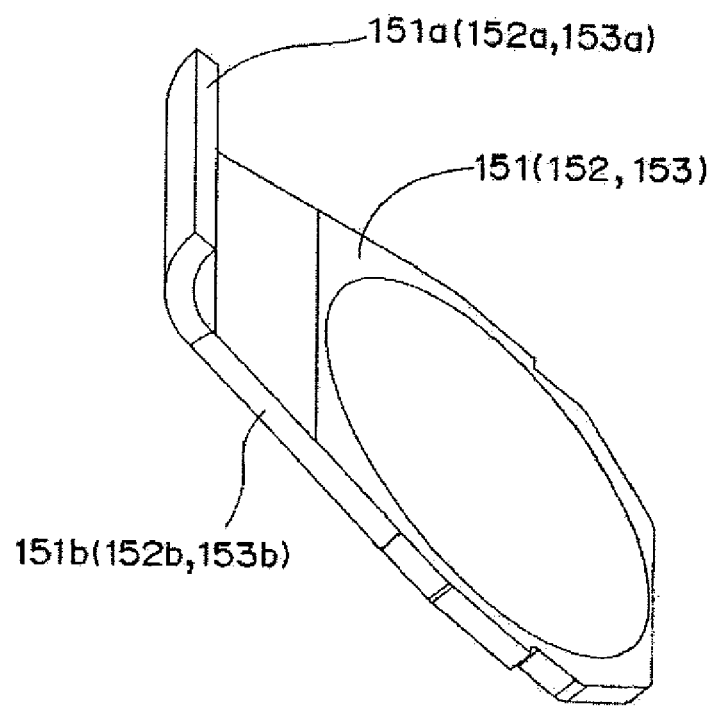

As shown in FIG. 21, the first, second and third transparent display plates 151, 152 and 153 have plane shapes capable of being fitted to the first, second and third concave sections 126a, 126b and 126c of the base 120, and one end of each thereof is bent into virtually right angles so that the light guide portions 151a, 152a and 153a, which are fitted to the first, second, and third light guide grooves 121, 123 and 124, are formed (FIG. 16). Moreover, each of the first, second and third transparent display plates 151, 152 and 153 allows light made incident thereon from the back face side, as it is, to pass therethrough. In contrast, light rays, made incident thereon from the light guide portions 151a, 152a and 153a, are respectively diffused by diffusing elements or diffusing structures formed on the diffusing units 151b, 152b and 153b, and then reflected by fine dimples so that the resulting light rays are released through the opening portions 161, 162 and 163 of the cover 160, which will be described later. Moreover, a pattern of characters, symbols, graphics and the like may be formed by using fine dimples, if necessary, so that the pattern may be displayed. Here, the fine dimples may be formed on either the surface or the back surface of each of the transparent display plates 151 to 153; however, these may be preferably formed on one surface on the base 120 side, thereby allowing the surface to become brighter. Moreover, by providing the diffusion portions 151b, 152b and 153b, it becomes possible to restrain luminance irregularities and luminance lines, and consequently to provide a uniform pattern display.

Figure 22A:
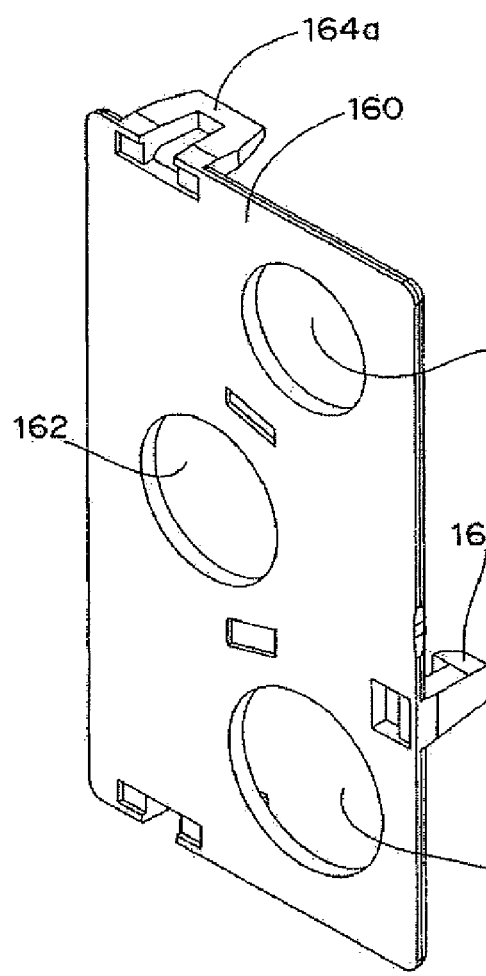
FIGS. 22A and 22B are perspective views that respectively show the surface side and the back face side of a cover shown in FIG. 16.
Figure 22B:
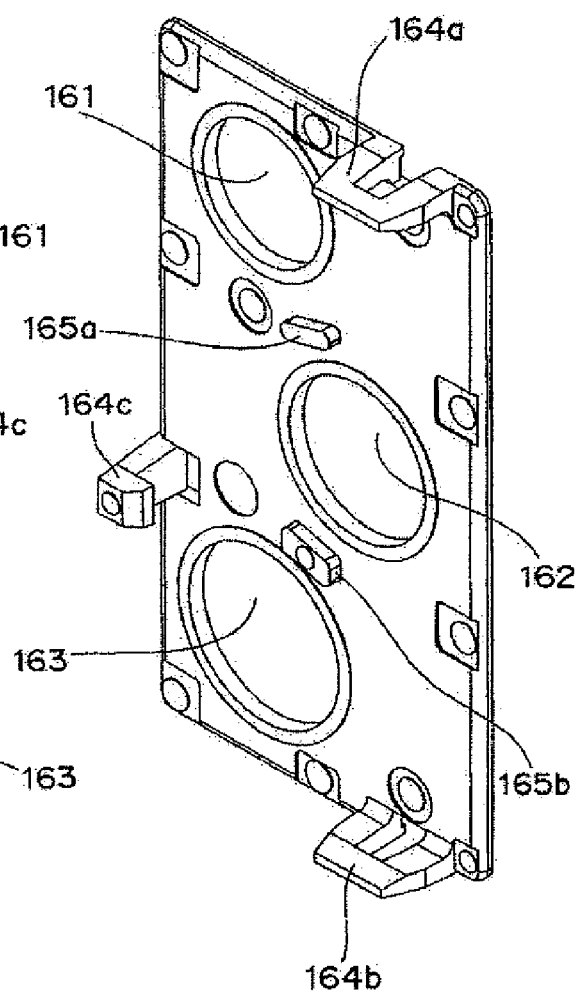

As shown in FIG. 22, the cover 160, which has a surface shape capable of being fitted to the surface of the base 120, is provided with first, second and third opening portions 161, 162 and 163 at positions respectively corresponding to the light-shielding portions 131, 132 and 133 of the light-shielding sheet 130. Moreover, on the outer circumferential edge portion of the cover 160, first, second and third elastic claw portions 164a, 164b and 164c, which are respectively engaged with the first and second engaging claws 128a and 128b, and the cut-out groove 128c of the base 120, are formed. Furthermore, the cover 160 is provided with position regulating protrusions 165a and 165b that are respectively fitted to the cut-out grooves 127a and 127b of the base 120, and formed on the back face on the printed substrate 100 side so as to protrude therefrom.

Figure 23:
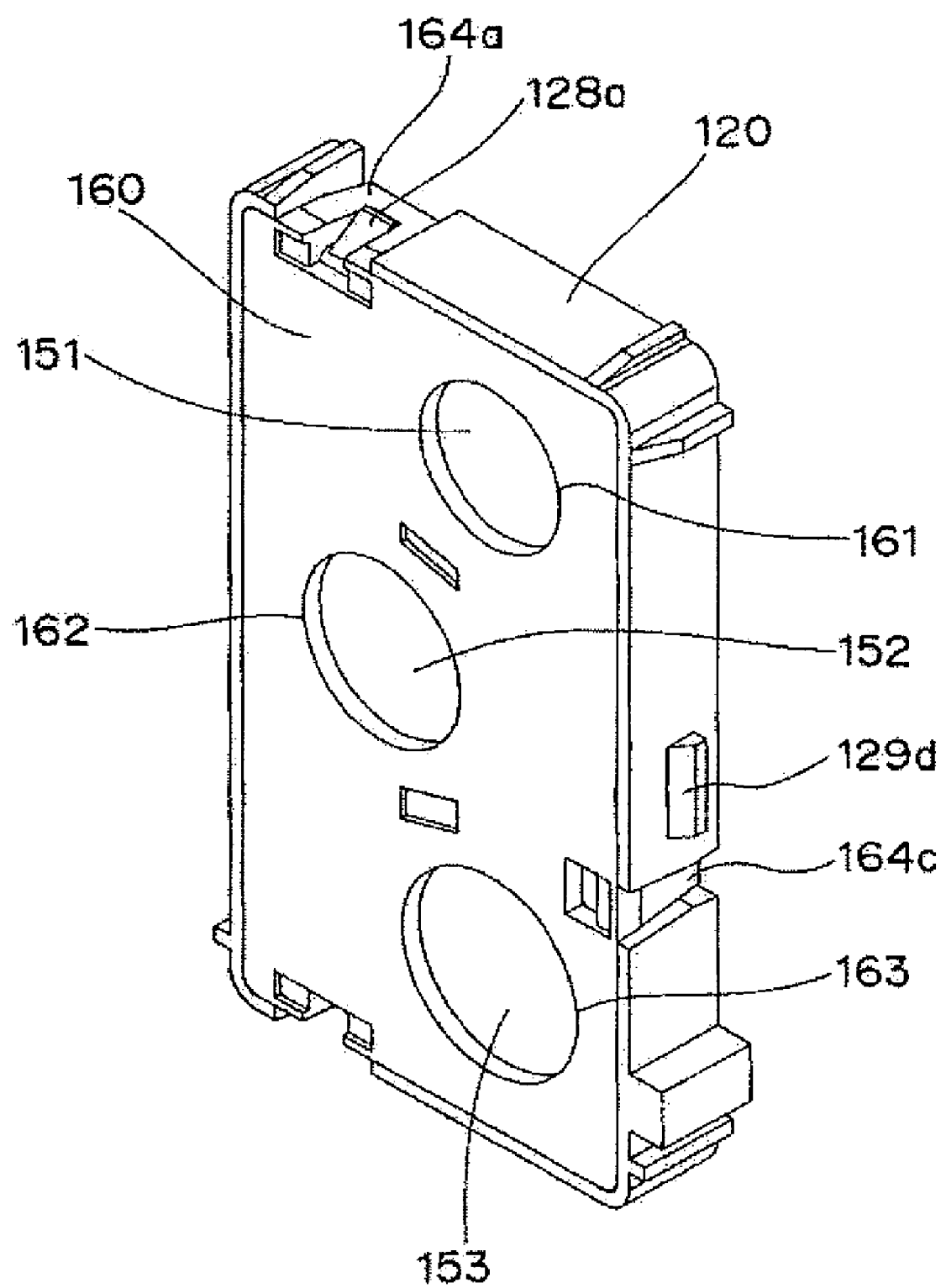
FIG. 23 is a perspective view that explains an assembling method.

Therefore, upon assembling the display unit, first to fifth LEDs 111 to 115 are packaged at predetermined positions of the printed substrate 100. Here, after the shielding mask 130, the diffusion sheet 140 and the transparent display plates 151, 152 and 153 have been successively positioned on the base 120, the first, second and third elastic claw portions 164a, 164b and 164c are respectively engaged with the first and second engaging claws 128a and 128b and the cut-out groove 128c of the base 120 (FIG. 23). Next, the base 120 is secured to the printed substrate 100 so that the assembling processes are completed.

In accordance with the present embodiment, protruding bands that separate the first, second, third concave sections 126a, 126b and 126c of the base 120 and the paired position regulating protrusions 165a and 165b of the cover 160 are used for separating the first, second and third transparent display plates 151, 152 and 153. Therefore, the adjacent first, second, third transparent display plates 151, 152 and 153 are mutually free from causing light interference, and have an advantage that a clear displaying process can be carried out.

Figure 17A:
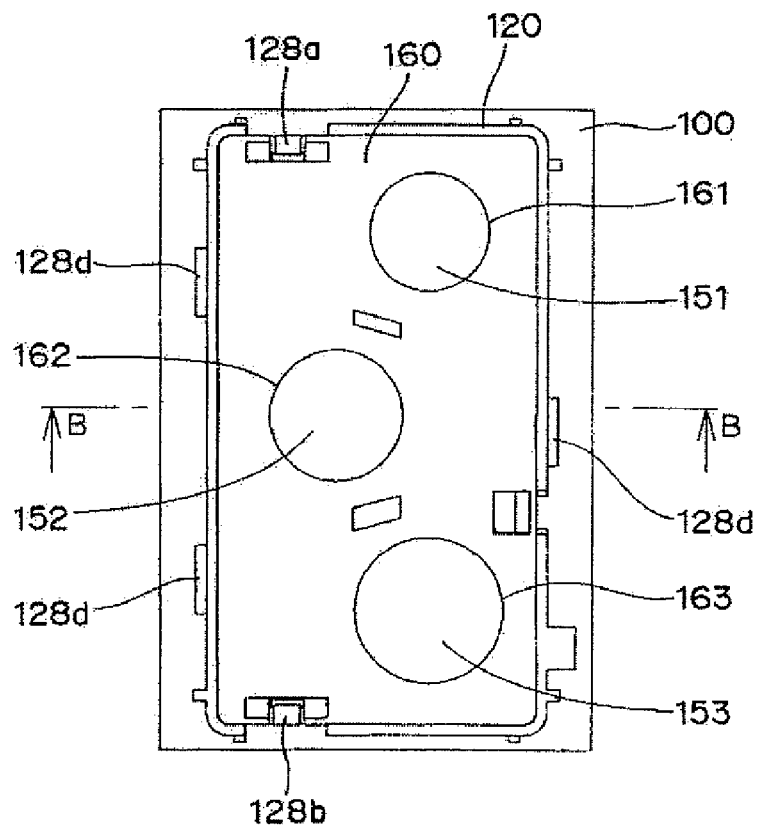
FIG. 17A is a plan view that shows a display device shown in FIG. 16.
Figure 17B:
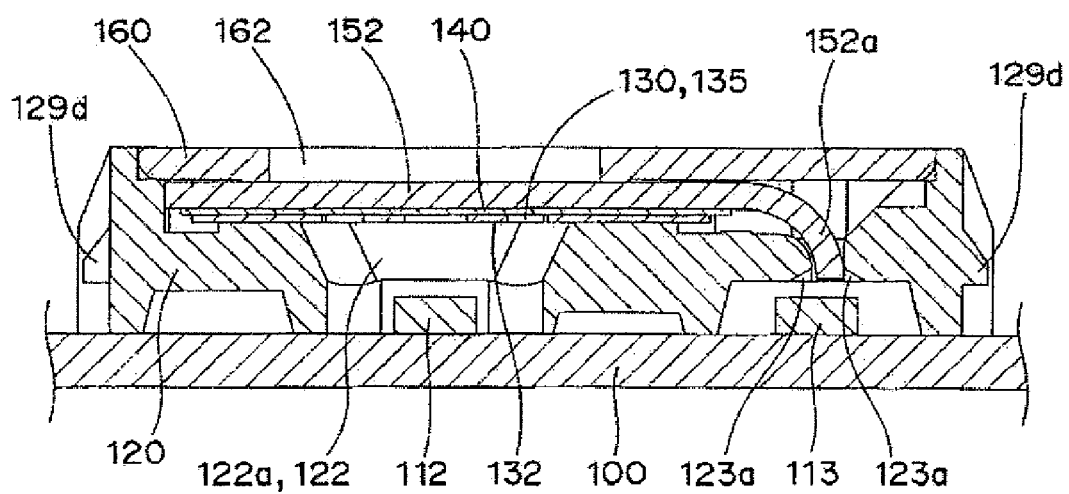
FIG. 17B is a cross-sectional view taken along line B-B of FIG. 17A.
Figure 24:
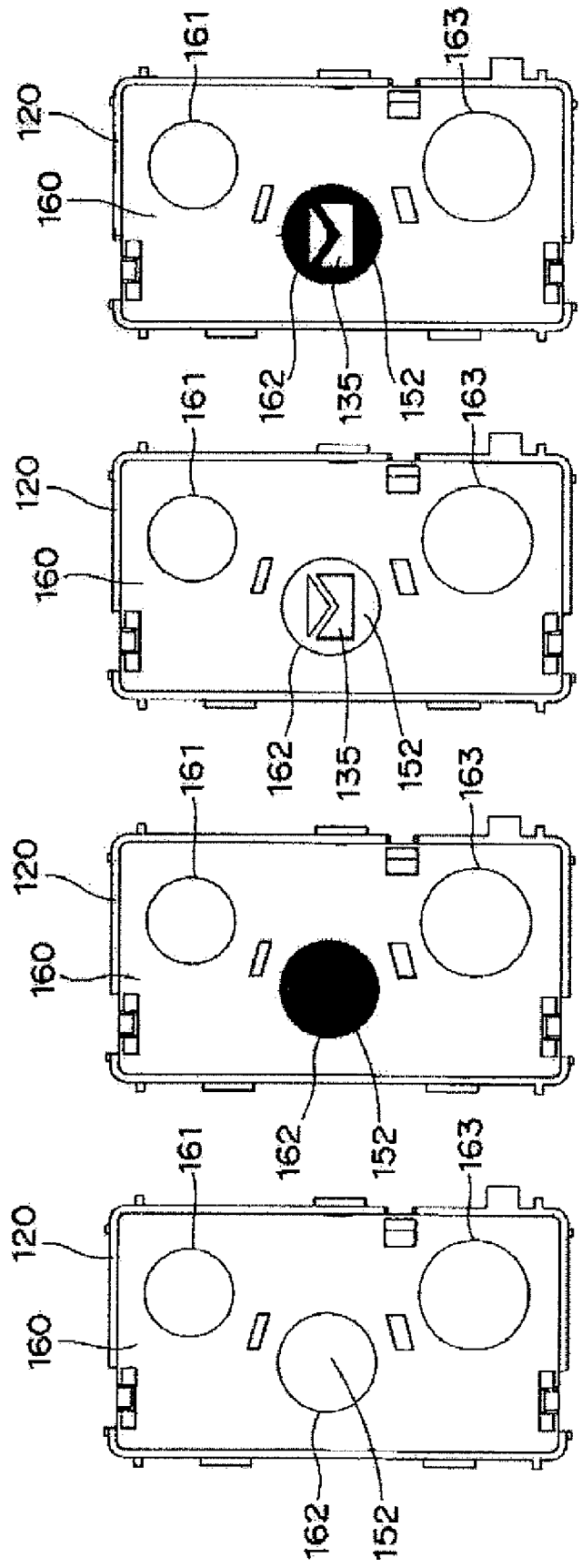
FIGS. 24A to 24D are front views that show operation states of the display unit shown in FIG. 16.
Figure 25:
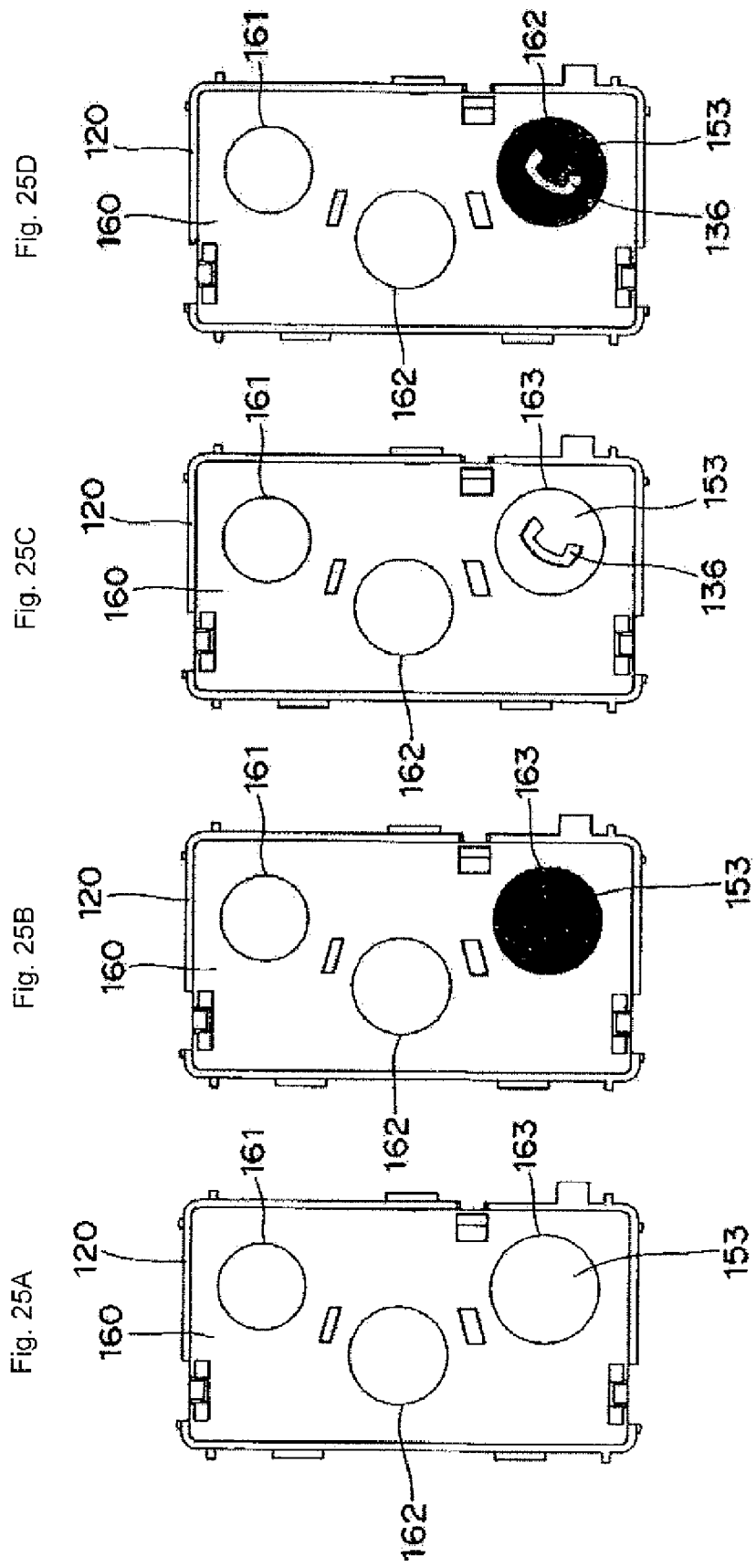
FIGS. 25A to 25D are front views that show other operation states of the display unit shown in FIG. 16.

Referring to FIGS. 24 and 25, the following description will discuss the method for using the above-mentioned display unit. For example, in the case when only the third LED 113 corresponding to the second transparent display plate 152 exposed to the second opening portion 162 shown in FIG. 24A is turned on, as shown in FIG. 17, light from the third LED 113 is made incident on the light guide unit 152a of the second transparent display plate 152, while being reflected off the taper face 123a of the second light guide groove 123 of the base 120, so that it is visually observed through the second opening portion 162 (FIG. 24B). In the case when only the second LED 112 is turned on, light that has been reflected off the taper face 122a of the first light guide hole 122 of the base 120 is transmitted through the punch-out hole 135 of the light-shielding mask 130, and then allowed to pass through the diffusion sheet 140 and the second transparent display plate 152 so that a pattern that informs the user of an arrival of an E-mail can be visually recognized through the second opening portion 162 (FIG. 24C). In the case when the second and third LEDs 112 and 113 are turned on simultaneously, the pattern that informs the user of an arrival of an E-mail can be visually recognized in the light-emitting second transparent display plate 152, through the second opening portion 162 of the cover 160 (FIG. 24D). In particular, since the pattern has high luminance in the light passing through the punch-out holes 135, the pattern can be clearly distinguished within the second opening portion 162 so that the input/output processes of different signals or the like can be displayed in various modes.

Similarly, for example, in the case when only the fourth LED 114 corresponding to the third transparent display plate 153 exposed to the third opening portion 163 of the cover 160 shown in FIG. 25A is turned on, light from the fourth LED 114 is made incident on the light guide unit 153a of the third transparent display plate 153, while being reflected off the taper face 124a of the light guide groove 124 of the base 120, so that it is visually observed through the third opening portion 163 (FIG. 25B). In the case when only the fifth LED 115 is turned on, light that has been reflected off the taper face 125a of the light guide hole 125 of the base 120 is transmitted through the punch-out hole 136 of the light-shielding mask 133, and then allowed to pass through the diffusion sheet 140 and the third transparent display plate 153 so that a pattern of a telephone receiver that informs the user of an arrival of a telephone call can be visually recognized through the third opening portion 163 (FIG. 25C). In the case when the fourth and fifth LEDs 114 and 115 are turned on simultaneously, the pattern that informs the user of an arrival of a telephone call can be visually recognized in the light-emitting third transparent display plate 153, through the third opening portion 163 of the cover 160 (FIG. 25D). In particular, since the pattern has high luminance in the light passing through the punch-out holes 136, the pattern can be clearly distinguished within the third opening portion 163 so that the input/output processes of different signals or the like can be displayed in various modes.

Figure 26:
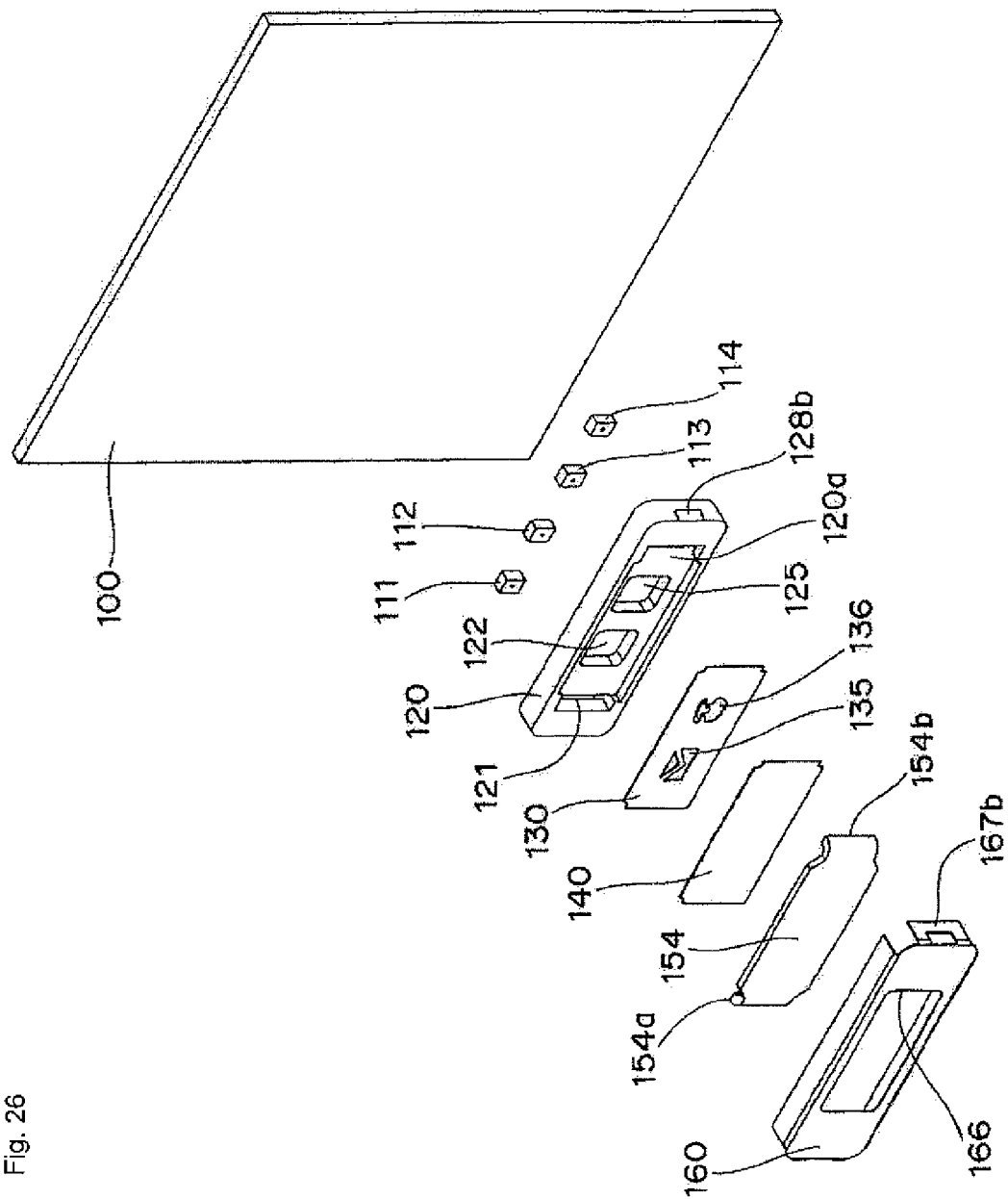
FIG. 26 is an exploded perspective view that shows a sixth embodiment of a display unit according to the present invention.
Figure 27A:
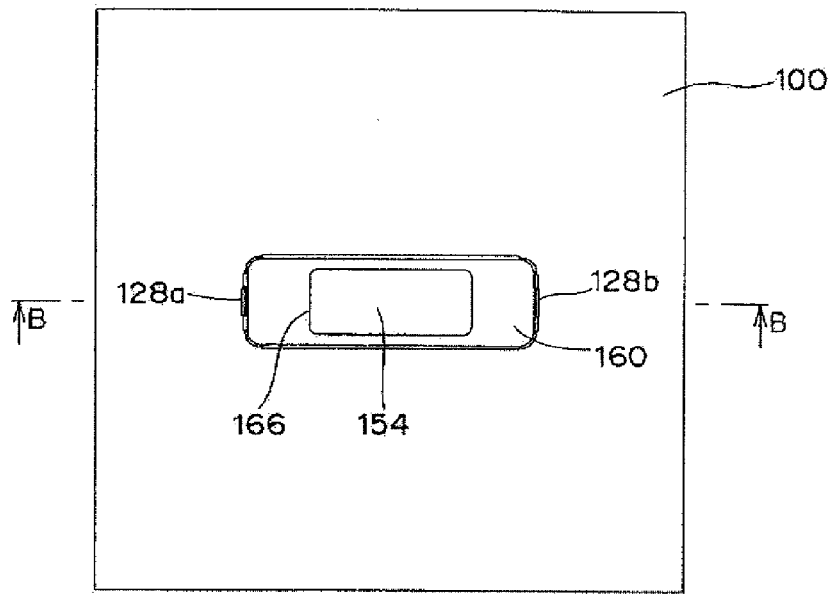
FIG. 27A is a plan view of the display unit shown in FIG. 26.

As shown in FIGS. 26 and 27, the sixth embodiment relates to a display unit that can provide an even display through one opening of the cover, or can display patterns of different characters, symbols, graphics or the like therethrough.

That is, the display unit of the present embodiment is constituted by a printed substrate 100, first to fourth LEDs 111 to 114, a base 120, a light-shielding mask 130, a diffusion sheet 140, a first transparent display plates 154 and a cover 160.

The first to fourth LEDs 111 to 114 are packaged on predetermined positions on the surface of the printed substrate 100, and light reflective films are formed on the surface thereof on demand.

Figure 27B:
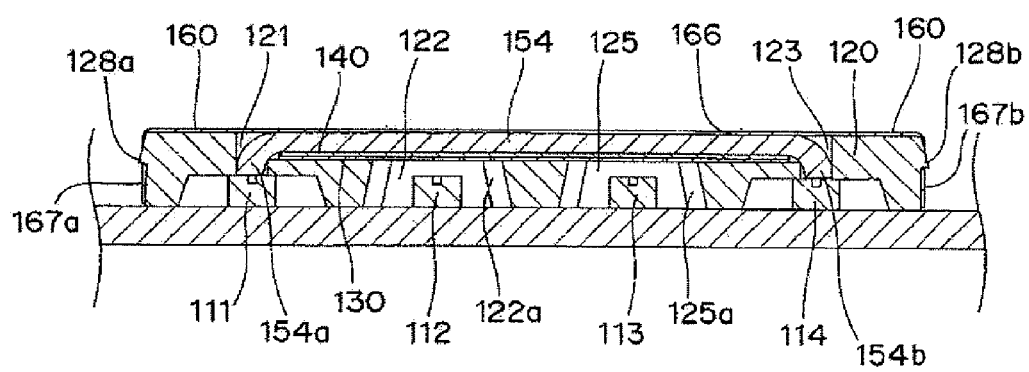
FIG. 27B is a cross-sectional view taken along line B-B of FIG. 27A.

As shown in FIGS. 26 and 27B, the base 120 has a plane shape capable of being packaged in the printed substrate 100. Moreover, in the base 120, at positions corresponding to the first to fourth LEDs 111 to 114 within the bottom face of a concave section 120a placed in the center portion of the surface on the cover 160 side, first light guide groove 121, first light guide hole 122, second light guide hole 125 and second light guide groove 123 are respectively formed. Annular taper faces 122a and 125a are formed on the opening edge portions of the first light guide hole 122 and the second light guide hole 125 on the printed substrate 100 side. The base 120 is made from a resin material that easily reflects LED light so that the reflection efficiency thereof is improved. Here, the base 120 may be formed by a normal resin material, with reflective films being formed thereon. Moreover, on the outside face on the short side opposing to the base 120, engaging claws 128a and 128b, used for engaging with and stopping the cover 160, which will be described later, are formed so as to protrude therefrom.

The light-shielding mask 130, which has a plane shape capable of being fitted to the concave section 120a, is made from a material having a high reflectance, such as an SUS material, and the surface of the cover 160, which will be described later, is also processed to have a low reflectance, in the same manner as in the fourth embodiment. Moreover, punch-out holes 135 that depict an envelope used for indicating the arrival of an E-mail and punch-out holes 136 that depict a telephone used for indicating the arrival of a telephone call are respectively formed at positions corresponding to the first and second light guide holes 122 and 125.

The diffusion sheet 140 has plane shapes capable of covering the light-shielding mask 130 and of being fitted to the concave section 120a of the base 120. In accordance with the diffusion sheet 140, by diffusing light rays from the second and third LEDs 112 and 113 that have passed through the punch-out holes 135 and 136, the punch-out holes 135 and 136 are concealed, and the existing positions of the second and third LEDs 112 and 113 are made unrecognizable.

As shown in FIG. 26, the transparent display plates 154 has plane shapes capable of being fitted to the concave sections 120a of the base 120, and two ends thereof are bent into virtually right angles so that the light guide portions 154a and 154b are allowed to be fitted to the first and second light guide grooves 121 and 123. Moreover, a pattern of characters, symbols, graphics and the like may be formed on the transparent display plate 154 by using fine dimples, if necessary, and the pattern may be displayed.

As shown in FIG. 26, the cover 160, which has a surface shape capable of covering the surface of the base 120 and of being fitted thereto, is provided with an opening portion 166 that is formed in a manner so as to surround the first and second light guide holes 122 and 125. Moreover, the cover 160 has four side walls formed by respectively bending its outer circumferential edge portion, and of the four side walls, the side walls corresponding to shorter sides of the base 120 are respectively provided with first and second elastic claw portions 167a and 167b formed thereon, which are allowed to engage with first and second engaging claws 128a and 128b of the base 120.

Therefore, upon assembling the display unit, first to fourth LEDs 111 to 114 are packaged at predetermined positions of the printed substrate 100. Here, after the shielding mask 130, the diffusion sheet 140 and the transparent display plate 154 have been positioned on a concave section 120a of the base 100, the first and second elastic claw portions 167a and 167b are respectively engaged with the first and second engaging claws 128a and 128b of the base 120 (FIG. 27). Next, the base 120 is secured to the printed substrate 100 so that the assembling processes are completed.

Next, in the case when the display unit is used, for example, upon turning on the first and fourth LEDs 111 and 114, light rays from the first and fourth LEDs 111 and 114 are made incident on the light guide units 154a and 154b of the transparent display plate 154, while being reflected off the inner side faces of the light guide grooves 121 and 123 of the base 120, so that the resulting light rays can be visually observed through the opening portion 166 of the cover 160. In accordance with the present embodiment, since two light rays from the first and fourth LEDs 111 and 114 are made incident, a bright displaying process can be carried out evenly. Here, when only the second LED 112 is turned on, a light ray, reflected off the taper face 122a placed on the light guide hole 122 of the base 120, is allowed to transmit through the punch-out hole 135 of the light-shielding mask 130. Thus, by allowing the light ray to pass through the diffusion sheet 140 and the transparent display plate 154, a pattern that informs the user of an arrival of an E-mail can be visually recognized through the opening portion 166. Moreover, in the case when the first, fourth and second LEDs 111, 114 and 112 are turned on simultaneously, a pattern of an envelope can be visually observed within the light-emitting transparent display plate 154 through the opening portion 166 of the cover 160. In particular, since the luminance of light rays passing through the punch-out holes 135 that depict an envelope is high, the pattern can be clearly distinguished within the opening portion 166 so that the input/output processes of different signals or the like can be displayed in various modes.

Similarly, for example, in the case when only the third LED 113 is turned on, light that has been reflected off the taper face 125a formed on the light guide hole 125 of the base 120 is transmitted through the punch-out holes 136 that depict a telephone of the light-shielding mask 130. Thus, by allowing the light ray to pass through the diffusion sheet 140 and the transparent display plate 154, a pattern that informs the user of an arrival of a telephone call can be visually recognized through the opening portion 166. Moreover, in the case when the first, third and fourth LEDs 111, 113 and 114 are turned on simultaneously, a pattern of a telephone can be visually observed within the light-emitting transparent display plate 154 through the opening portion 166 of the cover 160. In particular, since the luminance of light rays passing through the punch-out holes 136 is high, the pattern can be clearly distinguished within the opening portion 166 so that the input/output processes of different signals or the like can be displayed in various modes.

In the above-mentioned embodiment, since LEDs of three colors combined into one unit are used, more various expressions can be obtained by selecting color phases of the LEDs to be light-emitted.

Figure 28:
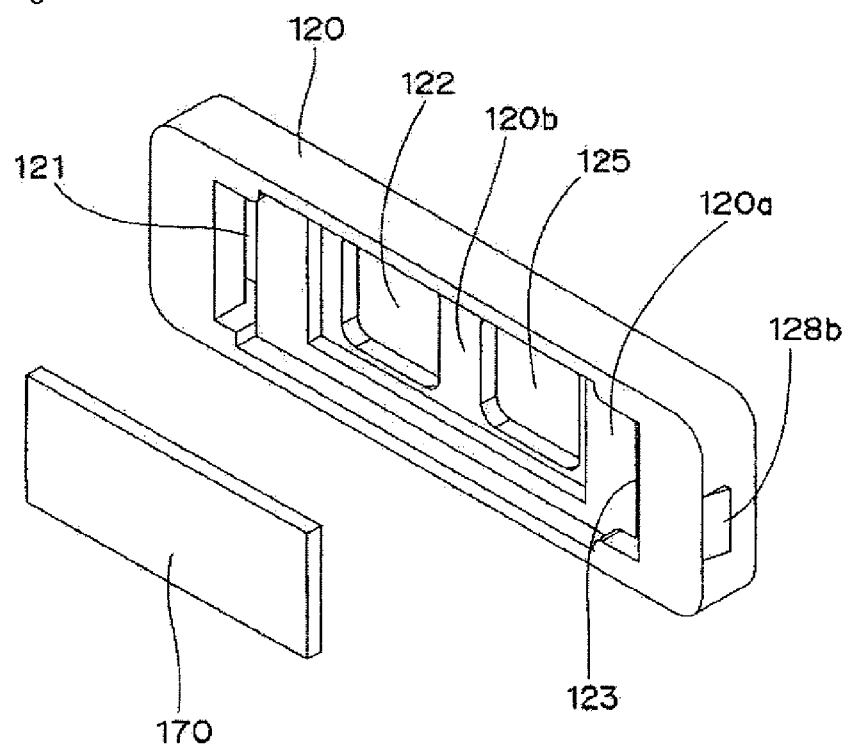
FIG. 28 is an exploded perspective view that shows a seventh embodiment of a display unit according to the present invention.

As shown in FIG. 28, the seventh embodiment has virtually the same structure as the sixth embodiment, and differs therefrom in that a concave part 120b that is lower than the concave section 120a of the base 120 by one step is formed in the center thereof, with a diffusion sheet 170 being attached to the concave part 120b.

In accordance with the present embodiment, in the case when a diffusion distance between the transparent display plate 154 and the light source is not sufficiently obtained because of thinness of the entire device, by utilizing two diffusion sheets 140 and 170, light rays can be diffused more uniformly so that the existing positions of the LEDs are made unrecognizable.

Figure 29:
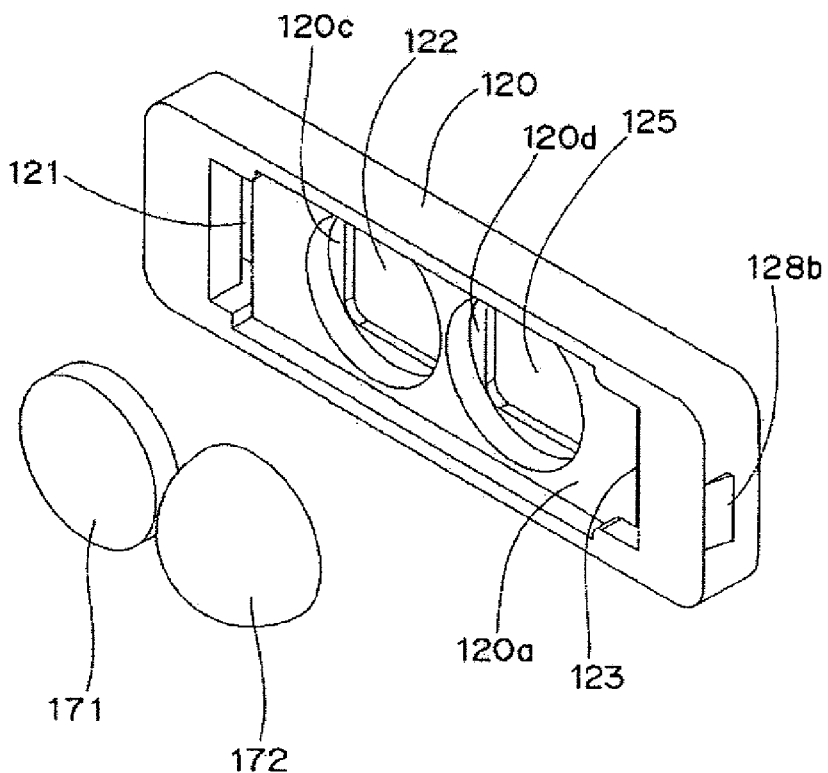
FIG. 29 is an exploded perspective view that shows an eighth embodiment of a display unit according to the present invention.

As shown in FIG. 29, the eighth embodiment has virtually the same structure as the sixth embodiment, and differs therefrom in that a pair of fitting holes 120c and 120d are formed on the bottom face of a concave section 120a of the base 120, with a diffusion sheet 171 and a diffusion lens 172 being respectively embedded and assembled therein. Here, the lens 172 may be produced together with the base 120 as an integral part.

According to the present embodiment, by installing the diffusion sheet 171 and the diffusion lens 172, light can be diffused. For this reason, even in the case when a sufficient diffusion distance is not maintained for the transparent display plate 154 because of thinness of the base 120, light rays are diffused uniformly so that the existing positions of the LEDs can be made unrecognizable.

Additionally, according to the present embodiment, it is confirmed that, by utilizing a resin material (made by Mitsubishi Engineering-Plastics Corporation) capable of easily reflecting light rays from LEDs, as well as by forming a taper face (see FIG. 17), the luminance of light rays passing through the transparent display plate 152 is made 1.98 times higher and the luminance of light rays passing through the light-shielding mask 132 is made 1.41 times higher.

In the above-mentioned fifth to eighth embodiments, by preparing the printed substrate as an electrode plate, or by laminating an electrode film or an electrode sheet on the printed substrate, a display unit having a switching function may be provided.

INDUSTRIAL APPLICABILITY

The display unit of the present invention may be combined not only with a touch switch, but also with a mechanical switch.

Moreover, the display unit may have not only a structure in which a plurality of transparent display plates are stacked on an electrode plate, but also a structure in which only one transparent display plate is placed on an electrode plate.

The invention claimed is:

1. A display unit comprising:
   a light source: and
   at least one or more transparent display plates, each having a plurality of fine dimples formed on at least one surface thereof,
   wherein light rays from the light source are respectively made incident on the transparent display plates, and reflected by the plurality of fine dimples so that a pattern of at least one of characters, graphics, and symbols is made visually observed uniformly,
   further comprising: transparent electrode plates sandwiched between a plurality of transparent display plates, each having a plurality of fine dimples formed on at least one surface thereof and a plurality of light sources respectively placed on the surface and back surface of each of the electrode plates,
   wherein light rays from the light sources are made incident on the side end face of each of the transparent display plates and reflected by the plurality of fine dimples so that a pattern of at least one of characters, graphics, and symbols is made visually observed uniformly.

2. The display unit according to claim 1, wherein the dimples are randomly arranged.

3. The display unit according to claim 1, further comprising: a control circuit that detects a change in an electrostatic capacity between the electrode formed on the electrode plate and a reference electrode, and on-off controls the light source.

4. The display unit according to claim 1, wherein a light guide unit that receives light from a light source placed on the electrode plate, and directs the light to a side end face of the transparent display plate is installed on one side edge portion of the transparent display plate.

5. The display unit according to claim 1, wherein a light diffusion sheet and a light-shielding mask having punch-out holes used for displaying a pattern of at least one of characters, graphics, and symbols are placed between the transparent display plate placed closest to the electrode plate and the electrode plate, with a light source for the pattern being placed at a position facing the punch-out holes of the light-shielding mask.

6. The display unit according to claim 5, wherein the face of the light-shielding mask to be visually observed has a low reflectance.

7. The display unit according to claim 1, wherein the transparent display plate is exchangeable.

8. A display unit comprising:
   a light source; and
   at least one or more transparent display plates, each having a plurality of fine dimples formed on at least one surface thereof.
   wherein light rays from the light source are respectively made incident on the transparent display plates, and reflected by the plurality of fine dimples so that a pattern of at least one of characters. graphics, and symbols is made visually observed uniformly,
   further comprising: at least one or more transparent display plates stacked on an electrode and light sources placed on the electrode plate,
   wherein light rays from the light sources are respectively made incident on the side end face of each of the transparent display plates and reflected by a plurality of fine dimples formed on at least one surface of each of the transparent display plates so that a pattern of at least one of characters, graphics, and symbols is made visually observed uniformly.

9. The display unit according to claim 8, wherein a light guide unit that receives light from a light source placed on the electrode plate, and directs the light to a side end face of the transparent display plate is installed on one side edge portion of the transparent display plate.

10. The display unit according to claim 8, wherein a light diffusion sheet and a light-shielding mask having punch-out holes used for displaying a pattern of at least one of characters, graphics, and symbols are placed between the transparent display plate placed closest to the electrode plate and the electrode plate, with a light source for the pattern being placed at a position facing the punch-out holes of the light-shielding mask.

11. The display unit according to claim 8, wherein the transparent display plate is exchangeable.

12. A display unit comprising:
    a light source; and
    at least one or more transparent display plates, each having a plurality of fine dimples formed on at least one surface thereof,
    wherein light rays from the light source are respectively made incident on the transparent display plates, and reflected by the plurality of fine dimples so that a pattern of at least one of characters, graphics, and symbols is made visually observed uniformly,
    wherein a diffusion sheet and at least one or more transparent display plates are successively placed on a face on the side to be visually observed of a light-shielding mask having punch-out holes used for displaying a pattern of at least one of characters, graphics, and symbols, and light from the light source is made incident on the side end face of the transparent display plate and reflected by a plurality of fine dimples formed on at least one of faces of the transparent display plate so as to be visually observed, while light from the light source placed at the position facing the punch-out holes of the light-shielding mask is allowed to pass through the punch-out holes and the transparent display plate so as to be visually observed.

13. The display unit according to claim 12, wherein a light guide unit that receives light from a light source placed on the electrode plate, and directs the light to a side end face of the transparent display plate is installed on at least one side edge portion of the transparent display plate.

14. The display unit according to claim 13, further comprising: a diffusion unit placed between the light guide unit of the transparent display plate and fine dimples, wherein light rays from the light sources are diffused by the diffusion unit so that a pattern of at least one of characters, graphics, and symbols is made visually observed uniformly.

15. The display unit according to claim 12, wherein the face of the light-shielding mask to be visually observed has a low reflectance.

16. The display unit according to claim 12, wherein the transparent display plate is exchangeable.

17. The display unit according to claim 12, wherein the dimples are randomly arranged.

18. The display unit according to claim 12, wherein diffusion sheets are placed on the surface and back surface of the light-shielding mask.

19. The display unit according to claim 12, wherein a diffusion sheet is placed on the light-shielding mask on the surface side to be visually observed, with a diffusion lens being placed on the back surface side of the light-shielding mask.

* * * * *